US010748327B2

(12) United States Patent
Paulson et al.

(10) Patent No.: US 10,748,327 B2
(45) Date of Patent: Aug. 18, 2020

(54) METHOD AND SYSTEM FOR THE 3D DESIGN AND CALIBRATION OF 2D SUBSTRATES

(71) Applicants: Ethan Bryce Paulson, Texarkana, TX (US); Brent Kelvin Paulson, Texarkana, TX (US)

(72) Inventors: Ethan Bryce Paulson, Texarkana, TX (US); Brent Kelvin Paulson, Texarkana, TX (US)

( * ) Notice: Subject to any disclaimer, the term of this patent is extended or adjusted under 35 U.S.C. 154(b) by 189 days.

(21) Appl. No.: 15/987,904

(22) Filed: May 24, 2018

(65) Prior Publication Data

US 2018/0350132 A1    Dec. 6, 2018

Related U.S. Application Data

(60) Provisional application No. 62/513,165, filed on May 31, 2017.

(51) Int. Cl.
| | |
|---|---|
| *G06T 15/10* | (2011.01) |
| *G06T 17/10* | (2006.01) |
| *G06F 30/00* | (2020.01) |
| *G06F 111/20* | (2020.01) |

(52) U.S. Cl.
CPC .............. *G06T 15/10* (2013.01); *G06F 30/00* (2020.01); *G06T 17/10* (2013.01); *G06F 2111/20* (2020.01); *G06T 2219/021* (2013.01)

(58) Field of Classification Search
CPC ..................................................... G06T 15/10
USPC ......................................................... 345/427
See application file for complete search history.

(56) References Cited

U.S. PATENT DOCUMENTS

| 8,703,110 | B2 | 4/2014 | Ferry | |
|---|---|---|---|---|
| 2006/0212150 | A1 | 9/2006 | Sims, Jr. | |
| 2007/0211052 | A1* | 9/2007 | Tak | G06T 15/00 345/426 |
| 2008/0059956 | A1* | 3/2008 | Su | G06F 8/41 717/140 |
| 2008/0117212 | A1* | 5/2008 | Woo | G06T 15/005 345/427 |
| 2010/0073379 | A1* | 3/2010 | Berger | G06T 13/20 345/473 |

(Continued)

*Primary Examiner* — Jason C Olson
(74) *Attorney, Agent, or Firm* — Ariel S. Bentolila; Bay Area IP Group, LLC

(57) ABSTRACT

A system and method including scanning an object with a three-dimensional (3D) scanning module of a computing system; providing a three-dimensional (3D) image model from said scanned object or from a user input with a 3D CAD module of said computing system executing a computer code configured to perform said three-dimensional (3D) image model step stored in said non-transitory computer readable medium; rescaling with a rescaling module of said computing system, said three-dimensional (3D) image model; calibrating with a calibration module of said computing system, said three-dimensional (3D) image model; retopologizing said three-dimensional (3D) image model with said calibration module; unwrapping said three-dimensional (3D) image model with a 3D to 2D translation module; converting, with said 3D to 2D translation module, said unwrapped three-dimensional (3D) image model into a two-dimensional (2D) graphic or embroidery file format.

20 Claims, 13 Drawing Sheets

(56) References Cited

U.S. PATENT DOCUMENTS

| | | | |
|---|---|---|---|
| 2010/0231582 A1* | 9/2010 | Turun | G06T 13/00 345/419 |
| 2010/0231590 A1* | 9/2010 | Erceis | G06T 11/001 345/426 |
| 2011/0292406 A1 | 12/2011 | Hollenbeck et al. | |
| 2015/0363665 A1 | 12/2015 | Szasz | |
| 2016/0319474 A1 | 11/2016 | Garland, III et al. | |

* cited by examiner

METHOD AND SYSTEM FOR THE 3D DESIGN AND CALIBRATION OF 2D SUBSTRATES

CROSS-REFERENCE TO RELATED APPLICATIONS

The present Utility patent application claims priority benefit of the U.S. provisional application for patent Ser. No. 62/513,165 entitled "Method for providing customized and/ or calibrated surface applied or fitted 2D substrates to applicable 3D objects or entities of available final 2D applications", filed on 31 May 2017 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a system and method for applying a 2D substrate onto an object or entity. More particularly certain embodiments of the invention relate to a system and method for designing and calibrating graphics or a two-dimensional substrate and applying onto a three-dimensional object or entity.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Currently a user uses one's spatial perception skills learned from experience to design and calibrate graphics onto an object or entity. This may have been possible primarily due to human comprehension of a spatially perceived object or entity which at times may be limited. Computers may have been used in terms of entering in data received from conventional means of measurement to print something to apply to simple regular objects like cylinders, boxes, or any flat regular surfaces. Although many years of experience in applying guess-work sized graphics to objects or entities can give a user the ability to proportionally and accurately apply the 2D substrate or graphics on an object or entity, they are still limited to semi-regular objects and the graphical quality their own human artistic ability can create, design, and calibrate.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that three-dimensional i.e., 3D printing technology may be typically used for creating a 3D model of an object and printing a physical model of the 3D object. It is believed that designing and calibrating graphics onto a three-dimensional object using a two-dimensional substrate may still face certain challenges like crimping depending on the formability of a 2D substrate.

The following are examples of specific aspects in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a solution has been to 3D scan an article like clothing before printing on it. This solution though commonly has limited applications to clothing and may usually not 3D scan to create an exact representation of an object. Furthermore, this solution may only have standard sizing for the clothing and not be useful for printing on non-clothing objects, creating custom clothing sewing patterns, or anywhere in general where a calibration may be needed on any complex object or entity. This may limit applications to printing on objects with a complex or irregular shape. Furthermore still, not having exact representations of objects being printed on may make it difficult to scale and convert to formats for various graphics programs to use so the result is as appears graphically before final application.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
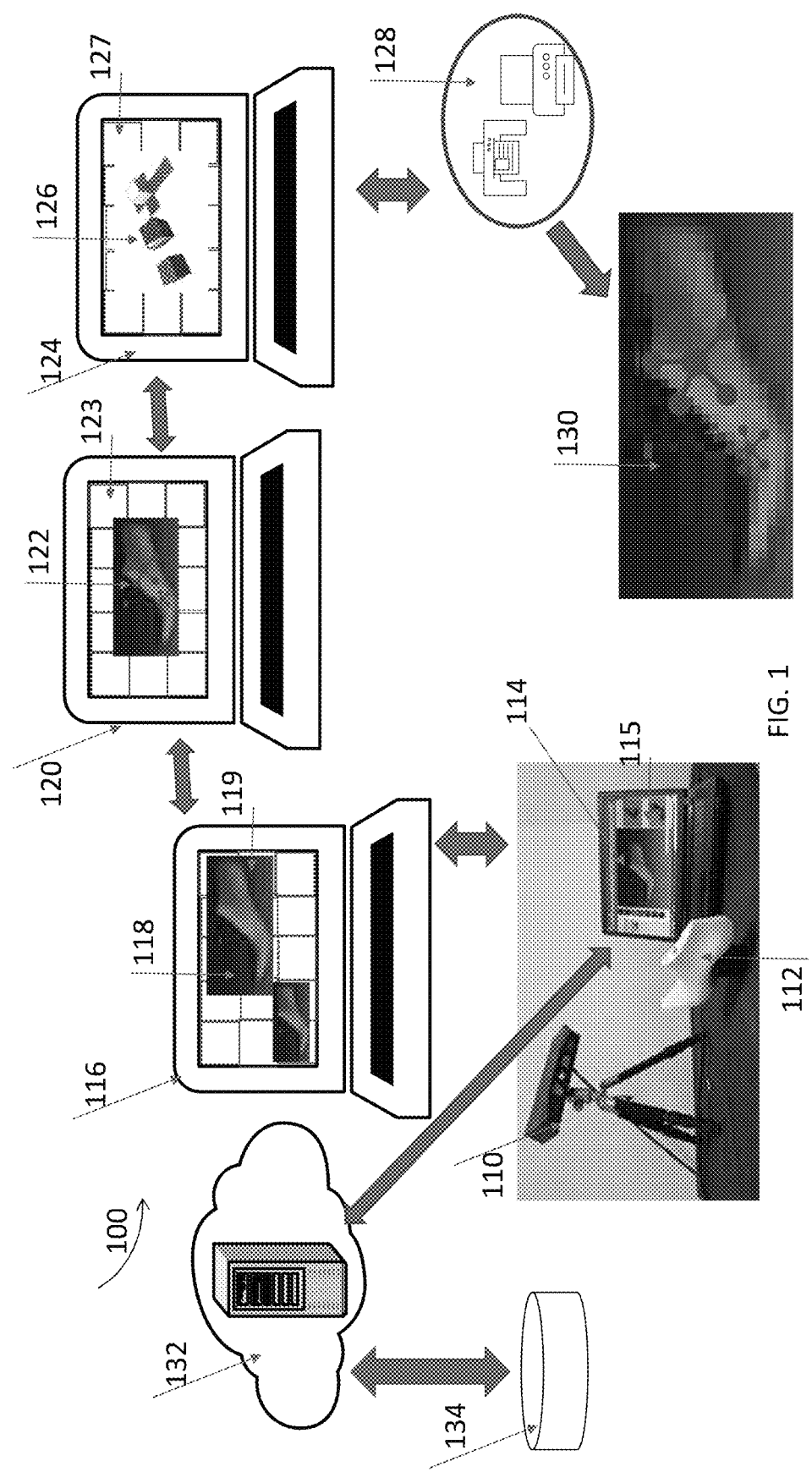
FIG. 1 illustrates an exemplary system for applying 2D substrate onto an object, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Embodiments disclosed herein provide a system and method for designing, calibrating, and applying a two-dimensional (2D) substrate onto a three-dimensional (3D) object. The system and method disclosed herein may not only give the ability to design and calibrate graphics to any object or entity but may also un-limit the quality of a graphic to an ability of a 2D substrate application printer employed. The system and method disclosed herein may overcome limited human ability to design and calibrate graphics or 2D substrates onto an object or entity proportionally and accurately. In various embodiments, the system and method disclosed herein may be used either on an object that may be printed using a 3D printer; or on any existing object; or on an object created or going to be created. For example, tattoos on a human or non-human entity, clothes on a human or non-human entity, coating or covering on a vehicle, coating or covering on a toy or any other application that uses a 2D printer to print graphics on any substrate, plot out a template onto a 2D substrate, or embroider a 2D substrate in any relative fashion as described herein. The substrate may then be used to imprint, sublimate, adhere to, sewn together to fit upon, or be displayed accurately and proportionally on any applicable object or entity of the chosen final 2D substrate application. In certain embodiments, the graphics chosen may include but are not limited to placement or cutting or fold marks on a solid color or textured 2D substrate.

Referring to FIG. 1 is illustrated an exemplary system 100 for applying a two-dimensional (2D) substrate onto an object, in accordance with an embodiment of the present invention. The system 100 may include a three-dimensional (3D) scanner 110 for scanning an object 112, a first computing system 114, a second computing system 116, a third computing system 120, a fourth computing system 124, a printer 128, at least a server 132, and at least a database 134. In certain embodiments, the first, second, third, and fourth computing systems may include a single computing system.

It may be appreciated by a person with ordinary skill in the art, in light of and in accordance with the teachings of the present invention that, any three-dimensional (3D) scanner may be used to scan the object 112 as long as the user utilizes the best 3D scanning techniques in order to provide the best possible scanned model for the method disclosed herein. In certain embodiments, if the 3D scanner may not produce clear scans, a 3D CAD (computer-aided design) user may have to edit and smooth out a resultant 3D model. Accordingly, it may be appreciated by a person with ordinary skill in the art, in light of and in accordance with the teachings of the present invention that, using an effective or a well-integrated 3D scanner respective to the objective object or entity applicable in the final application may provide the required result of a smooth and clean 3D model. For example, 3D scanners applicable may include but may not be limited to, short range, laser triangulation, structured light, sound or sonar wave based, laser based, handheld, arm based, CMM based, long range, single point long range, projected, medium range, optically tracked with a probe system type 3D scanner. In certain embodiments, the scanners may include 3D scanners or 3D scanner applications on computers or smart devices using pictures or videos to map the object and create a 3D model or significant map of it.

Additionally, it may be appreciated by a person with ordinary skill in the art, in light of and in accordance with the teachings of the present invention that, three-dimensional (3D) scanner stabilizing arms and all of the possible 3D scanning stabilizing techniques may also be employed to provide best possible scans of the object. Accordingly, tips and techniques to make the 3D scanner work better may be respective to the 3D scanner selected to be used in the process. For example, the stabilizing techniques may include but is not limited to, scanner arm automated along with the rest of the process, using a tripod, using turn table, using reflectivity props (to help with depth perception of the 3D scanner), using scanner depth perception aids, optimal lighting conditions, optimal 3D scanner distance, optimal reflectivity of object, optimal 3D scanner directional degree reference to the object or entity, optimal size of the object or entity relative to the respective 3D scanner best used, optimal surface structure or texture scanned by the best respective 3D scanner, and the like.

As used herein, retopologizing is a process of rebuilding the 3D model mesh with significantly the same volume and shape, at the same time, may have a different mesh layout and properties. In addition, the retopology process may rebuild the 3D model mesh to reduced polygon count which may enable UV unwrapping and deformation of the 3D model mesh. For example, retopologizing may make it easier to texture the 3D model mesh in Photoshop®, since retopologizing may enable the edges of the 3D model mesh to flow with the contours of the mesh using principles of interrupted sinusoidal projection. It may also control the density of the subdivisions so there may be more edges where detail is needed and fewer edges in simpler areas. An underlying grain of the 3D model's mesh affects a quality of the result. Retopology may also simplify and clean up noisy data in 3D scans.

As used herein, UV mapping is 3D modeling process of projecting a 2D image to a 3D model's surface for texture mapping. Before a texture is applied to the 3D model, UV mapping may be applied which may define the way of displaying any image file that may be viewed on an actual 3D surface. UV mapping may be used to wrap or project a 2D image texture onto a 3D mesh, where "U" and "V" are the axes of a UVW two-dimensional plane, and "X", "Y" and "Z" are the coordinates in the 3D space.

Accordingly the system may include any applicable three-dimensional (3D) object or entity respective to final application method, proper connection or supply to electricity for respective components to work properly, any 3D scanner as described hereinabove, any suitable graphics computer, any 3D CAD (computer-aided design) functioning software program adequate for functions regarded in this method from simple scaling or smoothing to creating an exact 3D model using traditional measurement methods, including also a pre-created and designed dimensionally proportional 3D model possibly pre-created for manufacturing of the product itself, i.e., may need average to above average user skill to implement depending on objective complexity regarding recreating the object or entity from scratch or simply scaling a 3D model that was scanned in un-proportionally, or the 3D scanner scans the object or entity properly and that 3D file can be directly exported into Photoshop or Photoshop functioning software programs if the 3D scanner automatically scans the object or entity into a low poly 3D mesh that is already design capable and unwrap-seamed properly fully ready for Photoshop design, this process may skip the 3D CAD aspect all together as long as there is no depth perceptual props used and the 3D scanner is technologically advanced enough not to need any 3D mesh patching or smoothing to better represent the real object. The 3D CAD aspect of 3D model manipulation may be done before or after the 3D model has been retopologized in a retopologization software program to retopologize the 3D model's mesh into a low polygonal count mesh from a high polygonal mesh count that the 3D scanner creates when plotting many precise points on the XYZ coordinate plane. Retopologizing is re-building the 3D model with significantly the same volume and shape but with a different mesh layout. A retopology process may rebuild the 3D model mesh to reduced polygon count which may allow UV unwrapping and deformation of the 3D model mesh. The mesh layout may be transformed into a design ready shape like a rectangle or square as opposed to a complex series of triangles that most 3D scanners create as their default mesh, unless the scanner has been designed to recreate a scanned object or entity into a low poly graphically design capable mesh. When this is done regardless of if a 3D scanner creates the low polygonal count mesh or not, the mesh itself may be aligned in accordance to best practices with the respective 2D substrate final application. During the retopologization step there may also be a proper seaming of the 3D model's mesh in a software program module that may do so along with the retopologizing and alignment of the mesh into low poly mesh. For example, retopologizing may make it easier to texture the 3D model mesh in Photoshop. The underlying grain of the 3D model's mesh affects the quality of the result. It may be desirable that the edges in the 3D model mesh flow with the contours of the mesh. It may also be desirable to control the density of the mesh subdivisions so there may be more edges where detail is needed and fewer edges in simpler areas. Retopology may also be a good way to simplify and clean up noisy data, such as 3D scans. The 3D model mesh itself may be seamed on predetermined coordinates most optimal in relation to how an end user would need to piece, fit, or stitch together each individual unwrapped, designed or embroidered upon, and printed UV map introduced in the UVW coordinate plane directly proportional to the XYZ coordinate plane representative of the exact 3D model of the final applicable object or entity. UV mapping projects the 2D image to the 3D model's surface for texture mapping. UV mapping is used to wrap the 2D image texture onto a 3D mesh model. Once the 3D model is retopologized properly and the appropriate seaming lines for how the 3D mesh will unwrap are seamed, the model may be unwrapped from the XYZ coordinate plane to the UVW coordinate plane according to how the seam lines were created on the 3D model. After that is complete an end user may upload the file of the 3D model in the XYZ coordinates and also a UV map template file or otherwise known as a "texture file" in the UVW coordinates into Photoshop or any similar functioning software program for functions regarded in this method or similar resulting functions regarding 2D to 3D and 3D to 2D exact correlative coordinate mapping and design such as for example UV mapping from UVW to XYZ coordinates when adding a design onto the UV map in the UVW coordinate plane an end user or operator may view exactly how and where the UV map and design may be placed onto the 3D model in the XYZ coordinate plane in relation to how the end user of the final 2D applicated object or entity wants and would specify. When the UV maps are designed upon and finished the 3D model with the template or texturing files of the UV maps applied may be directly related to how the final applicable object may look in full color and relative placement. This may be especially important for customer, end user, or operator design approval and the final 2D substrate applicator can use the 3D model as reference in how he/she should place the final applicant. The 3D modeling software which the 3D model designed upon may look identical to how the real object would look after final application. The UV maps/texturing template/unwrapped design files may be converted into a printable or embroider-able Photoshop or final application related graphic or embroidering file with the respective file specifications needed for the final application printer, plotter, or embroidering machine and end application process such as color modes and file type. The printable UV map design files may be manually or automatically resized for proper printing, embroidering, and application fitment relative to how the 3D model looks as there may be no direct input of dimension into UVW space from XYZ space even though the UV maps are directly relative in proportion and design placement the actual dimensions of the UV map to fit precisely when printed, plotted, or embroidered are not carried along from XYZ to UVW space. In order to have the proper size and fitment of the final printed UV map the end user may have many choices. A first possible choice may be to use a tailor's tape upon the real-life object or entity measuring the widest and longest distance apart of the seam lines on the 3D model in respect to the final object or entity fitment procedures. Then once an end user understands the widest and longest dimensions they may resize the UV map representative printable or embroider-able design file while maintaining the respective UV map's aspect ratio to the measured widest and longest dimensions. This same calibration process may be done to measure a widest and longest point along a 3D model relative to seaming lines as long as a model may be a same size and proportion as a real-life representative object or entity. In addition to this possible procedure of accurate final print size, plotting, or fitment size there may be others as well. A single polygon on the XYZ coordinate plane upon the 3D model's structural mesh may be chosen as the "key polygon" to determine the exact dimensions of that polygon whether it be length and width or simply determining the diagonal of the polygon. Once a dimension has been determined for the "key polygon" the structural mesh of the UVW unwrapped texture file or design ready printable file may be observed to find the same relative "key polygon" within the structural mesh to then scale the entirety of the respective file locking the aspect ratio to then match up the dimensions of that "key polygon" on the respective unwrapped mesh to the same dimensions taken down on the XYZ coordinate plane's "key polygon". Once each "key polygon" in both the XYZ and UVW coordinate plane's have the same dimensions then there may be a dimensional input effectively added into UV space and the unwrapped file can then be printed, plotted, or embroidered with 100% accuracy to the real 3D object or entity in respect to how it wrapped the 3D model from UVW to XYZ coordinate planes as long as the 3D model of the object or entity is in perfect relation to the real 3D object or entity. In addition to these three potential calibration techniques, Ethan B. Paulson and Brent K. Paulson have a proprietary software program conjoined within the system disclosed that can be utilized separately for use within the method disclosed herein. The afore mentioned software automatically matches the size of the unwrapped printable design or texture file to the size it may be relative to the 3D model and its respective seam lines to create another accurate method of calibrating the unwrapped file to print, plot, or embroider a 2D substrate to be applied to the real-life object or entity with the same relativity as the unwrapped file is to the 3D model from UVW to XYZ coordinate planes. Regardless of the previous print sizing/fitment sizing strategy of the unwrapped printable design file, the correctly sized design file may be sent to its respective final application 2D substrate printer to print, embroidery machine to embroider automatically, or for fabrics already printed or embroidered upon using this design process or is already the color and final substrate desired a plotter that will mark where to cut the fabrics or other 2D substrates along the border/seam lines to fit properly or cut the 2D substrate manually along the plotter lines before sewing together properly or utilizing an automated cutting and sewing manufacturing machine depending on final application and complexity of operation, respective operational replacement cartridge or material that may be needed in the respective final application 2D substrate printer, plotter, embroidery machine, and final application 2D substrate respective to the final application method. This methodology of a 3D design for the surface of a 3D object or entity may be used for a number of things only limited by currently available 2D substrate applications as newly created and future 2D substrate applications will also fall under applicability of this method and system. There may be a possibility to adapt this same methodology for the use of giving a 3D printer coordinates to 3D print a pre-sized and designed fitted piece of solid or flexible material to be placed or secured onto an end user desired object or entity. For example, the 3D mesh template file sized properly may be converted back into XYZ space, add an additional thickness dimension so it is no longer a 2D mesh, and print it as a perfect 3D printed cap to fit onto an end user desired object or entity with perfect fitment as in the perfect size and shape of the surface of the object and how a fitted piece would sit snug around the edges of that 3D scanned object or entity. So, if someone wanted a custom cover or cap to fit onto an existing or pre-existing object or entity they may have it 3D printed to fit to the object in the same way we are printing onto a 2D substrate to fit to an object or entity. The only difference in the process would be that the final UV map or overlay may be converted back into the XYZ coordinate plane which is 3D space and an additional dimension may be added to the 3D mesh, so it may no longer be a 2D mesh. That dimension may be the end user's desired thickness of the cover or cap and of course if the end user wanted designs to look as though they are carved into the cover or cap that could be done in 3D CAD (computer-aided design). Inclusive of this of course as well would be the end user's desired material they 3D print to. So, this method may additionally include the use of designing and printing a solid 3D cap or cover in any available 3D printable substrate to fit to an existing or pre-existing object or entity including the 2D substrate design aspect of the process so that after the 3D printable substrate is printed, a 2D substrate applicant designed and fitted in the same process may be applied after the 3D print was made to then decorate or design the surface.

In some embodiments, the computing systems 114, 116, 120, 124, may comprise a display interface 115, 110, 123, 127 respectively that may display at least one of a scanned 3D image, 3D image with a graphic design, and a process of unwrapping the graphic as a 2D substrate from the surface of the 3D image as described herein below. A printer 128 may be any suitable printer capable of printing the unwrapped graphic on a 2D substrate. Server 132 may be any computing platform that executes computer software and/or code from a non-transitory computer readable medium. Server 132 may also access a database 134 containing messages and solutions or information required to be provided in relation to the graphics, editing of scans, and the like. In some embodiments, system 100 may comprise two or more 3D scanners 110, single or multiple computing systems, two or more servers 132 with databases 134. In some embodiments, computing system 114 may communicate one or more 3D scanned images with/without the graphic designs to two or more servers 132. In a non-limiting example, computing system 114 may communicate one or more 3D scanned images with/without the graphic designs to multiple servers 132 and may poll the servers 132 to determine which server may include information on related 3D scanned images with/without the graphic designs.

In one embodiment, the UV mapping technology used herein may match the coordinates in the 2D texture map with specific coordinates on the 3D model. UV mapping may allow the 2D graphics or texture map to be painted correctly and accurately onto the 3D model. A UV overlay guide may be used to visualize how a 2D graphics or texture map may match up with the 3D model's surface coordinates and to what degree it is spaced away from the 3D model itself. A 2D UV map may be a flattened but still coordinately proportional from the 3D UV overlay along with all the graphics or embroidery representations and relative encoded instructions on placement, color, texture, etc.

As used herein the term sublimation processes may refer to a process which employs the properties of substances change from a solid to a gas without ever passing through a liquid phase. This process may be used to paint/dye/decorate/cover/label a multitude of different final substrates through first printing dyes onto plastic, card, paper, or fabric and then using heat and direct pressure the dyes are directly transferred onto or into the various final substrates, that may withstand the heat of thermoset powder coating as the final applicated substrate may be powder coated first before the sublimation process begins unless it is a colorless, white, or otherwise sublimate-able material not necessitating the use of a powder coat base, for the above stated purposes with a high degree of quality and durability after the dye sublimation transfer process has been completed. The various final substrates that may be powder coated and applied to with the process of dye sublimation utilizing any powder coating application methods include but are not limited to various metals, composite materials, plastics reinforced with fiber, plastics non-reinforced but in a mold, stone, glass, wood or particle board, fabrics, papers, films, leather and vinyl.

It may be appreciated by a person with ordinary skill in the art, in light of and in accordance with the teachings of the present invention, the 3D scanner 110 may be virtually any electronic device capable providing a 3D scan of an object as described herein above.

It may be appreciated by a person with ordinary skill in the art, in light of and in accordance with the teachings of the present invention, that the 3D scanner 110 may connect to any number of devices with virtually any wired and/or wireless means to proj ect/save the scanned image of an object. 3D scanner 110 may connect to virtually any device by means such as, but not limited to, Bluetooth connection, Ethernet cable, USB cable, WIFI, IRDA, etc.

It may be appreciated by a person with ordinary skill in the art, in light of and in accordance with the teachings of the present invention, a server 132 may be virtually any computing platform such as, but not limited to, a computer cluster, a laptop, a tablet, a smartphone, a web/cloud platform, etc. . . .

It may be appreciated by a person with ordinary skill in the art, in light of and in accordance with the teachings of the present invention that, a database 134 may be virtually any data storage device or devices. Database 134 may be, but not limited to, a plurality of data servers, a memory card. In another embodiment of the present invention, database 134 may be a memory card connected to server 132 or to any one or more of the computing systems 114, 116, 120, and 124.

It may be appreciated by a person with ordinary skill in the art, in light of and in accordance with the teachings of the present invention, that database 134 may contain virtually any data to improve the functionality of the system 100. Database 134 may include, without limitation, 3D scanned information on various objects, various graphics, various graphics on 2D substrates formed by unwrapping from the 3D object, techniques for smoothening the objects when required, and the like.

It may be appreciated by a person with ordinary skill in the art, in light of and in accordance with the teachings of the present invention, system 100 and method for applying a 2D substrate onto an object described herein may partially or completely be contained in a local computing platform and/or network, i.e., the computing system 114. Accordingly, in certain embodiments, automating the entire system and method for applying a 2D substrate onto an object disclosed herein into one machine or a series of machines for the respective final application may provide an acceptable return on investment (ROI) and consistency. It may be appreciated by a person with ordinary skill in the art, in light of and in accordance with the teachings of the present invention, that due to the custom nature of the system and method for applying a 2D substrate onto an object described herein not all final applications may be fully automated such as tattooing, however applications such as on-demand custom clothes manufacturing or other sublimation related applications may be fully automated.

Figure 2:
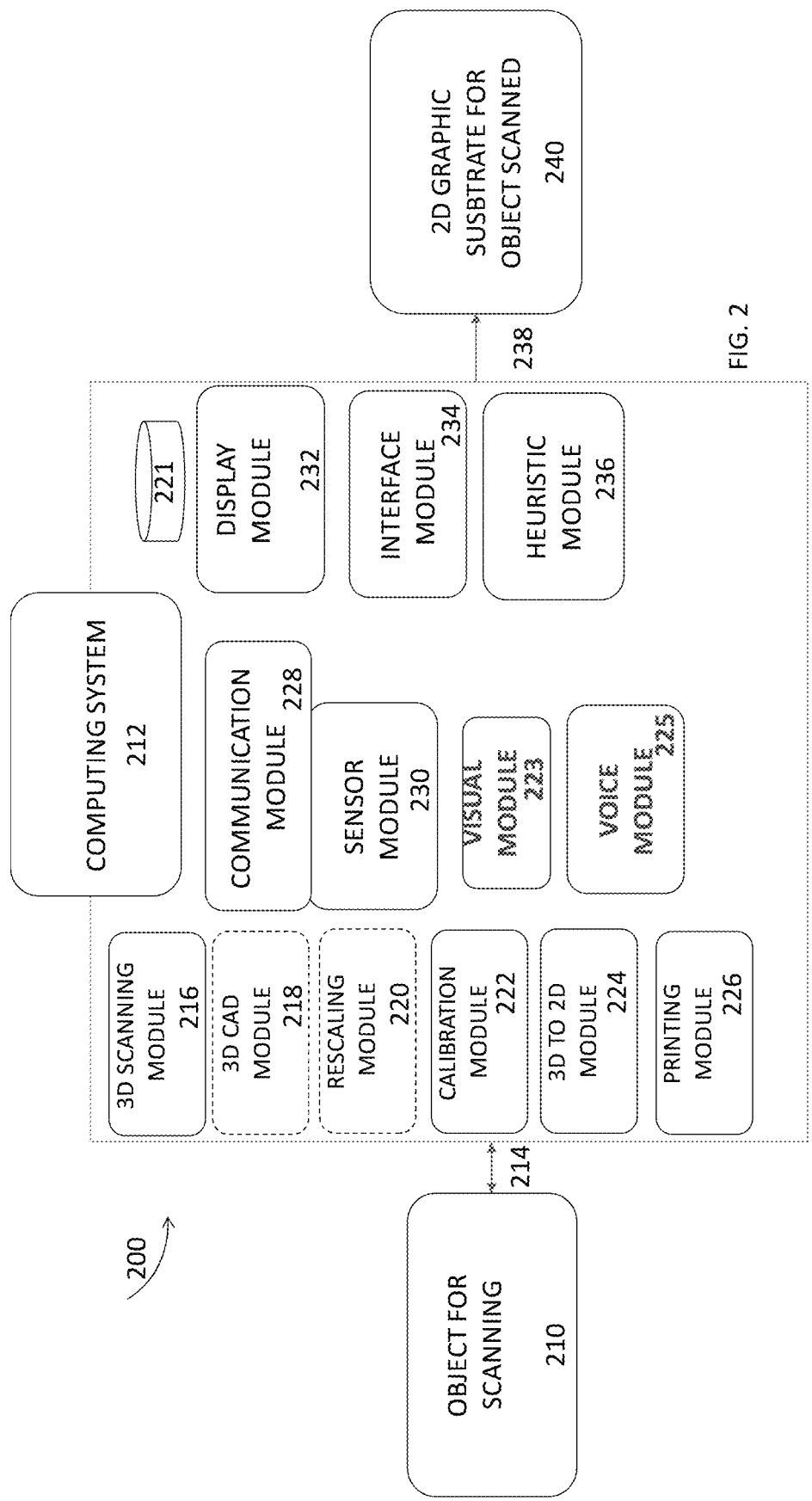
FIG. 2 illustrates an architecture of an exemplary system for applying a 2D substrate onto an object, in accordance with an embodiment of the present invention.

Referring to FIG. 2 is illustrated an architecture 200 of an exemplary system for applying a 2D substrate onto an object, in accordance with an embodiment of the present invention. The computing system 212 may include a 3D scanning module 216, an optional 3D CAD module 218, an optional rescaling module 220, a database 221, a calibration module 222, a 3D to 2D conversion/translation module 224, a printing module 226, a communication module 228, a sensor module 230, a visual module 223, a voice module 225, a display module 230, an interface module 232, and a heuristic module 236. A 3D scanning module 216 may have a means of scanning an object, processing the scan, and providing a scan as a visual output such as, without limitation, a processing unit, a computer, or a server 132 to execute computer code and/or algorithms from a non-transitory computer readable medium for an object for scanning 210 that is scanned 214 and to effectively provide a 2D graphic substrate for the scanned object. A 3D CAD module 218 may have a means of providing a 3D image of an object, processing the image, and providing an image as a visual output such as, without limitation, a processing unit, a computer, or a server 132 to execute computer code and/or algorithms from a non-transitory computer readable medium for an object for scanning 210 that is scanned 214 and to effectively provide a 2D graphic substrate for the scanned object. A rescaling module 220 may have a means of providing a rescaled 3D image of an object, processing the image, and providing an image as a visual output such as, without limitation, a processing unit, a computer, or a server 132 to execute computer code and/or algorithms from a non-transitory computer readable medium for an object for scanning 210 that is scanned 214 and to effectively provide a 2D graphic substrate for the scanned object. A calibration module 224 may have a means of calibrating (i.e. retopologizing) a 3D image of an object, processing the image, and providing an image as a visual output such as, without limitation, a processing unit, a computer, or a server 132 to execute computer code and/or algorithms from a non-transitory computer readable medium for an object for scanning 210 that is scanned 214 and to effectively provide a 2D graphic substrate for the scanned object. A 3D to 2D translation conversion module 224 may have a means of translating or converting or unwrapping (i.e. UV mapping) a 3D image model of an object to a 2D file format that are dimensionally proportional to the 3D model and to the actual object of the final application, processing the 2D file format, and providing an image as a visual output such as, without limitation, a processing unit, a computer, or a server 132 to execute computer code and/or algorithms from a non-transitory computer readable medium for an object for scanning 210 that is scanned 214 and to effectively provide a 2D graphic substrate for the scanned object. A printing module 226 may have a means of printing the translated or converted or unwrapped 3D image model of an object in a 2D file format that are dimensionally proportional to the 3D model and to the actual object of the final application, processing the 2D file format, and providing an image as a visual output such as, without limitation, a processing unit, a computer, or a server 132 to execute computer code and/or algorithms from a non-transitory computer readable medium for an object for scanning 210 that is scanned 214 and to effectively provide a printed 2D graphic substrate for the scanned object. A communication module 228 may have a means of receiving a communication, processing the communication, and sending a communication, such as, without limitation, a processing unit, a computer, or a server 132 to execute computer code and/or algorithms from a non-transitory computer readable medium for an object for scanning 210 that is scanned 214, validated, and to effectively provide a printed 2D graphic substrate for the scanned object. Some embodiments may allow for the user-friendly input of a command into the system for optimal output relative to the final application utilizing any respectively implementable graphical user interface (GUI), human-machine interface (HMI), or command-line interface (CLI). A sensor module 230 may have a means of receiving sensor information from sensors in the 3D scanner, such as, without limitation, a processing unit, a computer, or a server 132 to execute computer code and/or algorithms from a non-transitory computer readable medium for an object for scanning 210 that is scanned 214, and to effectively provide a printed 2D graphic substrate for the scanned object. Visual module 223 may have a means of receiving a visual input, processing the visual input, and providing a visual input/output such as, without limitation, a processing unit, a computer, or a server 114 to execute computer code and/or algorithms from a non-transitory computer readable medium for an object for scanning 210 that is scanned 214, and to effectively provide a printed 2D graphic substrate for the scanned object. This method may provide the ability to calibrate and design a 2D substrate from a 3D object or entity to cover completely or partially although there already may be a 2D object such as presized clothing that may be designed on based on its current fit on a 3D object or entity. In Photoshop, we may view in split screen the 3D model and the flat unwrapped UV map or overlay at the same time. Which means that as the artist designs on the flat unwrapped file it may be automatically showing the graphic on the 3D model where those designs may be placed and how they may look relative to the same coordinates on the UV map. This unwrap may then be printed or plotted to be applied in the same relation as it was on the 3D model of the final applicable 3D object or entity to cover partially or completely. Voice module 218 may have a means of receiving a voice input, processing the voice input, and providing a voice input/output such as, without limitation, a processing unit, a computer, or a server 134 to execute computer code and/or algorithms from a non-transitory computer readable medium for an object for scanning 210 that is scanned 214, and to effectively provide a printed 2D graphic substrate for the scanned object. When a 3D representation of an object is input into a computer by any possible 3D scanning means that gives the proper dimensions of the actual object, it may be possible to retopologize then design and calibrate a 2D substrate to fit an object or entity by means of UV mapping and unwrapping to print or plot the 2D substrate. So, when it comes to ultrasound if a proper 3D dimensional representation of, for example, a baby doll or even fetus, it may be possible to map and unwrap the 3D baby doll or unborn baby to plot out, print upon, or otherwise embroider clothes for that baby doll or unborn baby. It may be possible only if the ultrasound scanning gives the correct dimensions and full digital 3D representation of the entity or object. A database 221 may have a means of storing the data on the scanned 3D images, graphics, 3D to 2D conversion, validations, 2D substrates, such as, without limitation, a processing unit, a computer, or a server 132 to execute computer code and/or algorithms from a non-transitory computer readable. In one embodiment, the database 221 may be as described herein above with reference to FIG. 1. A display module 232 may have a means of displaying an image, for example, scanned 3D images, graphics, 3D to 2D converted images, validations, 2D substrates with graphics, and the like. An interface module 234 may have a means of interfacing with the various modules, for example, the sensor module 230, the communication module 228, and the 3D to 2D module 224, and the database 221, such as, without limitation, a processing unit, a computer, or a server 134 to execute computer code and/or algorithms from a non-transitory computer readable medium and provide interface support to assist the system 100 in performing its various functions. A heuristic module 230 may have a means of self-learning, such as, without limitation, a processing unit, a computer, or a server 134 to execute computer code and/or algorithms from a non-transitory computer readable medium, to assist the assimilation of various 3D scanned images and appropriate graphics to be displayed using the display module 232 on the computing system.

Once an object is scanned in, to properly design and calibrate the UV overlay or map, the 3D model may be retopologized. When the 3D scanner scans an object, it may create a mesh of the 3D model into a high polygon count mesh that may be far too complicated to be designed on, unwrapped, and printed, plotted, or embroidered upon properly regarding the final application relating to the 3D model designed upon. If the 3D model may be unwrapped for proper sizing or design of a 2D substrate, it still may be retopologized unless it is 3D scanned in by a scanner with the ability to scan into a low polygonal mesh/model with the proper properties for the relative final application. Retopologization may be the process to change the mesh of a 3D model in a variety of ways including changing it from a high polygon count mesh to a low count polygonal mesh, usually also changing the individual polygons from triangles to squares or rectangles for easier design and unwrap. Also, the direction in which the polygons in the mesh may be changed as well through retopologization, the direction matters in accordance with the optimal way the 3D object or entity needs to be unwrapped in the optimal software program according to the final application desired and applicable. Proper trigonometry functions of the principles and furthered implementations of interrupted sinusoidal projection may be used to eliminate tension in the mesh; thus, removing crimping and deformation in the final product relating to objects or entities necessitating the use thereof. In addition, retopologization may give the ability to fit clothing to the object or entity in which the user may specify where the retopologized mesh is in accordance with the 3D model itself such as to specify how tight (close to the object or entity) or loose (farther away from the object or entity) fitting the clothes may be once the process is complete and the individual pieces of clothing may be sewn together to fit the object or entity. Also, during the retopologization process, there may be the ability to specify if and where there would be seams in the UV or UVW overlay, texture, or map that may represent cutting, sewing, or folding lines. Currently without proper retopologization of the object or entity to the optimal polygon count, direction of polygons, size of polygons, if and where there may be seams on the 2D substrate if any, and distance of the retopologized mesh from the 3D model in accordance with how it will wrap to the object or entity itself in real life this methodology may not work to the best of its ability. In addition, utilizing principles of interrupted sinusoidal projection within a retopologization step may optimize a final product for applications that may require a reduction of crimping in a 2D substrate for seamless application. Upon properly utilizing principles of interrupted sinusoidal projection crimping of a final product may be entirely reduced creating further opportunities to utilize potential final application methods on highly complex objects that may have never been applied on before. Although this entire process is also streamlined within a system to the operation of once the 3D scanner scans in the object or entity relative to the end application, the 3D model may be automatically retopologized properly, unwrapped properly, and may be sent to a graphic design program that may or may not have automatic designs on the ready to be applied to that unwrapped overlay of the 3D model. Including having the opportunity to have a custom design created specifically for that 3D model placed and designed to the customer or user's specifications regarding final application. All together these processes of optimally combined modules for any potential final application methods of applying a designed and/or calibrated 2D substrate to or upon an object or entity can be entirely automated to the user's required specifications and output parameters.

It may be appreciated by a person with ordinary skill in the art, in light of and in accordance with the teachings of the present invention, that one or more modules may be embodied in a single device. In an alternative embodiment of the present invention, all modules except the printing module may be embodied in the computing system 114.

It may be appreciated by a person with ordinary skill in the art, in light of and in accordance with the teachings of the present invention, that virtually any algorithm and/or computer code may be used to recognize a visual on the visual module 223. Visual recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from a visual.

It may be appreciated by a person with ordinary skill in the art, in light of and in accordance with the teachings of the present invention, that virtually any algorithm and/or computer code may be used to recognize a voice on the voice module 225. Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from a voice.

It may be appreciated by a person with ordinary skill in the art, in light of and in accordance with the teachings of the present invention, that there may be a plurality of the same modules in the system architecture 200 for applying a 2D substrate onto an object. A plurality of modules such as, without limitation, 3D scanning module 216, an optional 3D CAD module 218, an optional rescaling module 220, a database 221, a calibration module 222, a 3D to 2D conversion/translation module 224, a printing module 226, a communication module 228, a sensor module 230, a visual module 223, a voice module 225,a display module 230, an interface module 232, and a heuristic module 236, may be present in the system architecture 200 for applying a 2D substrate onto an object. The plurality of similar modules may work in parallel or independently to improve the throughput and/or speed of the system architecture 200 for applying a 2D substrate onto an object. In an alternative embodiment of the present invention, a plurality of communication, sensor etc. . . . modules may be connected to a system for applying a 2D substrate onto an object via wired and wireless connections to access resources from different wired and wireless networks. In still another alternative embodiment of the present invention, a plurality of similar modules may form a secondary system for applying a 2D substrate capable of seamlessly substituting a messing and/or failing module.

It may be appreciated by a person with ordinary skill in the art, in light of and in accordance with the teachings of the present invention, that one or more modules may transmit module failure to a tech support server that is on an accessible network or over the internet.

It may be appreciated by a person with ordinary skill in the art, in light of and in accordance with the teachings of the present invention, that any module in system for applying a 2D substrate onto an object may perform data manipulation. Data manipulation such as, but not limited to, compression, encryption, formatting. In an alternative embodiment of the present invention, any module sending data may first compress the data prior to data transmission.

During a typical operation of the system for applying a 2D substrate onto an object the object or entity 112 may be scanned with a 3D scanner 110 into a 3D file format displayed on the display interface 115 of a computing system 114. In an alternative embodiment, an object or entity 112 may be recreated into a 3D file with a 3D CAD designated software program in the computing system 114. In certain optional embodiments, if the 3D scanner may not have the capability to create an exact scale representation of the object in digital form then the object must be opened in a 3D program, for example, on computing device 116, that allows rescaling to the exact size of the represented object, the scanned 3D file may be resized in the program to the exact dimensions of the actual object, and displayed on display interface 119. The 3D file of the digitally recreated object or entity may be opened using a designated software program in a computing system 120, for example Photoshop, 3D Photoshop and the like before or after the retopologization step to calibrate custom or premade artwork, designs, pictures, or images 122 onto the 3D object or entity 118 according to a user or a customer's specifications and display on display interface 123, or communicate the image to the server 132/database 134. In certain embodiments, physically relative placement markers may be optionally included on the outside or inside of the objective 3D digital graphic canvas to allow for easy installation once the 2D substrate with the graphics is printed, plotted, or embroidered using a printer, plotter, or embroidery machine 128. Once the graphics are calibrated properly onto the 3D object or entity digitally the 3D file may be displayed 123 to the customer through various digital media to allow the customer an opportunity to communicate any changes that may need to be made in the graphics before final application. The display may be viewed by the customer in the computing device 124 or may be viewed by the customer through a personal device in communication with the server 132. Once the final 2D graphic file is created to accurately and proportionally fit the object or entity it may be printed onto an optimal 2D substrate to be able to wrap the object or entity accurately respective to the 3D model for a variety of applications. The final respective graphics file may be plotted out from a templated substrate with or without the additional implementation of automated plotting and cutting systems, or giving encoded instructions in a 2D embroidery file consistent of sewing patterns relative to the 3D model to an automated embroidering system such as the SEWBOT™. During application of the various final applicants a user may refer to the 3D model to allow precision fitment and/or optionally a user may refer to the physically relative placement markers placed outside or inside of the objective 3D physical canvas and/or printed, plotted out, or embroidered upon the final 2D substrate applicant respective to final application.

Figure 3:
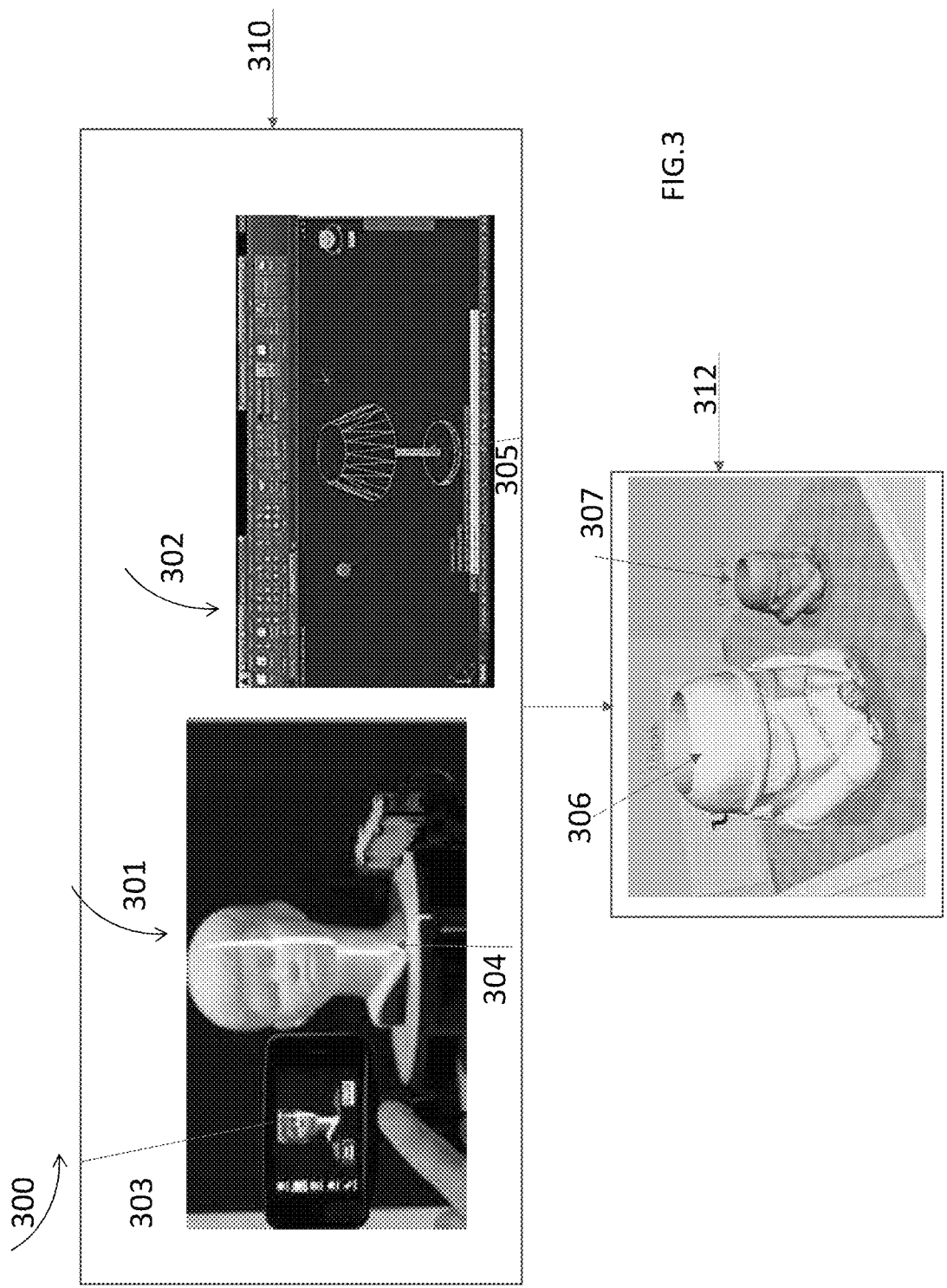
FIG. 3 illustrates an exemplary method for applying a 2D substrate onto an object, in accordance with an embodiment of the present invention.
Figure 3:
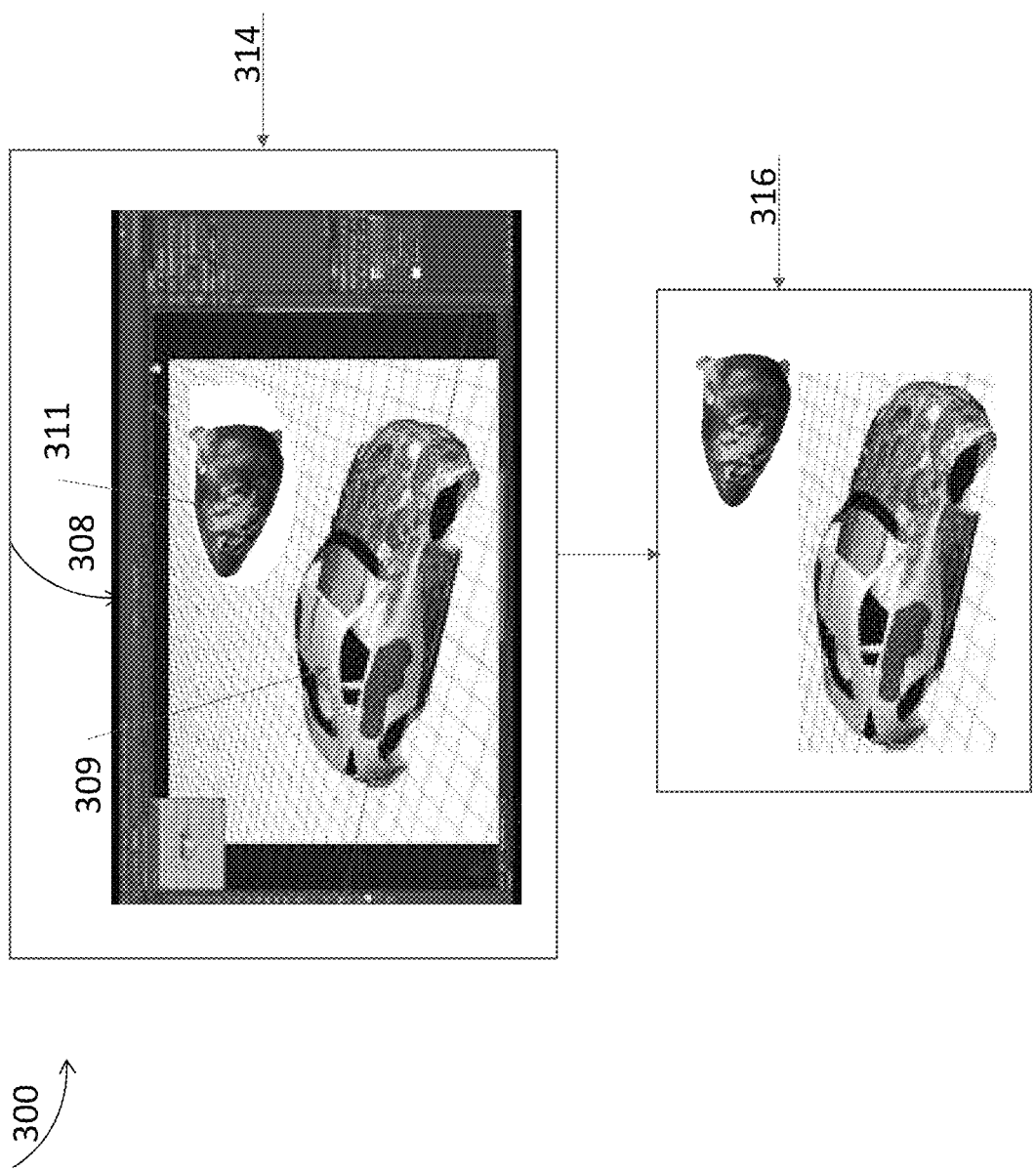
Figure 3:
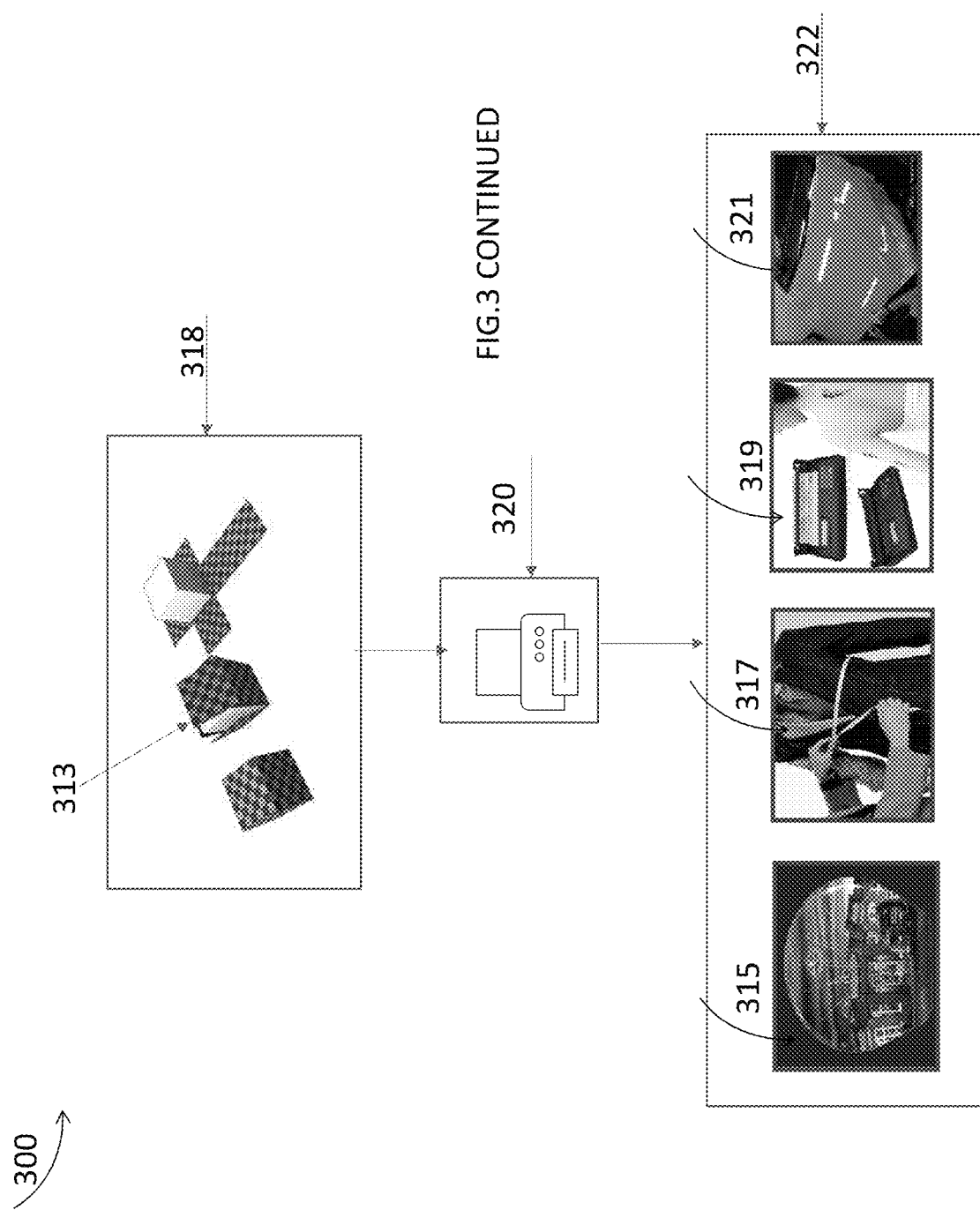

Referring to FIG. 3 is provided a flow chart 300 illustrating an exemplary pictorial method for applying a 2D substrate onto an object, in accordance with an embodiment of the present invention. In a first step 310, in one embodiment 301, an object 304 may be scanned with a 3D scanner 303 into a 3D file format in a computing system. In a first step, in another embodiment 302, an object 305 may be recreated into a 3D file with a 3D CAD program in a computing system. An optional step 312 may be executed if the scanner used or the CAD program may not have the capability to create an exact scale representation of the object in digital form. The object may then be opened in a 3D program in a computing system that allows rescaling to the exact size of the represented object i.e., size 306 or 307 as required to provide the exact dimensions of the actual object. i.e., the 3D scanned file may be opened into a re-topologizing software program to simplify the complicated mesh the 3D scanner created into a re-topologized and symmetrical 3D mesh of the 3D object or entity. In a step 314, the 3D file of the digitally recreated object or entity may be opened and viewed in the display interface of a computing system using a designated software program, for example, Photoshop. The designated software program may be used to calibrate custom or premade artwork, designs, pictures, images or digitally represented 2D substrate UV overlay functioning equivalent with or without texture added to represent the 3D object or entity's exact look of final application to the user or customer's specifications. A wide variety of graphic design effects from the respective software program may be used to add to the novelty of the end applicated 2D substrate resulting graphics or finished 2D substrate product and/or the 3D digital represented finished model the user or customer views before final printing and application onto the 3D object or entity according to the user or customer's specifications. Physically relative placement markers on the outside or inside of the objective 3D digital graphic canvas may be optionally included to allow easy installation after printing is completed. In a step 316, once the graphics are calibrated properly onto the 3D object or entity digitally the 3D file may be displayed to a customer through various digital media mediums to allow the customer an opportunity to communicate any changes that may need to be made in the graphics before final application of the a 2D substrate onto the object. In a step 318, once the graphics on the digitally recreated 3D object are approved by the user or customer the a 2D substrate may be digitally unwrapped from the 3D object into a 2D file format that is directly proportional and physically related to the original physical object's dimensions from the 3D file. i.e., In one embodiment, unwrap the calibrated design or properly fitted digital 2D substrate representation into a dimensionally proportional flat 2D UV map. The unwrapping may be done using a designated software program, for example, 3D Coat. In a step 320, once the 2D file is created to accurately and proportionally fit the object or entity it may be printed onto an optimal 2D substrate to be able to wrap the object or entity precisely for a variety of applications. The process 300 may end with a step 322 where the 2D substrate is placed on the object, for example, custom sublimation painting/dye processes 315, custom tailor-made clothes 317, custom tattoo stencils 319, custom vinyl or adhesive wraps 321, and the like. During application of various final applications, a user may refer to the digital 3D model and/or may refer to the physically relative placement markers placed outside or inside of the objective 3D physical canvas and/or the final 2D applicant to allow precision fitment. Accordingly, in one embodiment, the method may begin with an exact digital representation of a 3D object or entity and may end with an exact physical 2D substrate representation of the digitally designed and calibrated 2D UV map ready for final application of respective 2D substrate application.

Figure 4:
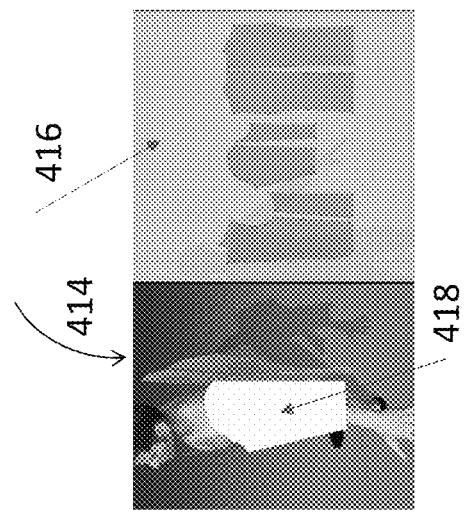
FIG. 4 illustrates exemplary applications that employ the system for applying a 2D substrate onto an object, in accordance with an embodiment of the present invention.
Figure 4:
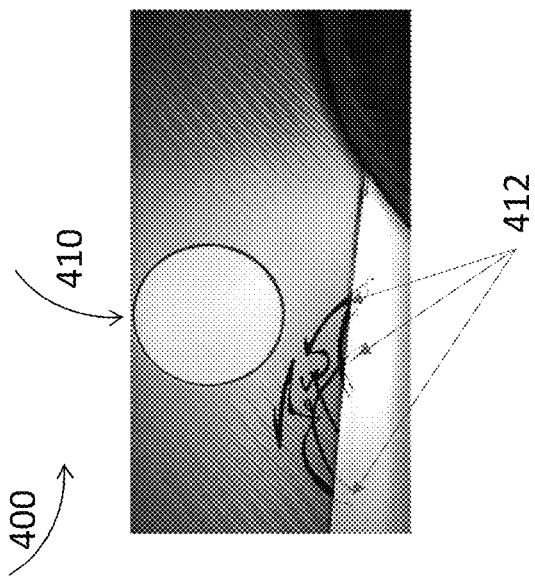

FIG. 4 illustrates exemplary applications 400 that employ the system for applying a 2D substrate onto an object, in accordance with an embodiment of the present invention. FIG. 4 includes two examples. Example 1 410, a vinyl substrate (applicant) for a vehicle quarter, and Example 2 414, a tailored suit. In Example 1 410 is shown a lineup of unwrapped printed 2D applicant/substrate as the physical object marking lines 412 show to place properly onto the object or entity i.e., placement markers 412 may be placed outside of the 2D substrate or applicant on an un-applied surface to aid in accurate placement on the surface applied 2D substrates. In Example 2, is shown a line of different parts of a custom suit 416 to be sewn together properly for custom tailored clothes variations for entities in Example 2. Any final application can refer to the digital 3D model or 2D UV map to insure proper placement, fitment, or alignment on the final object or entity as shown by the representation of an unwrapped sleeve on a hand of an object 418 to obtain accurate calibration before being sewn together to form the tailored suit. It may be appreciated by a person with ordinary skill in the art, in light of and in accordance with the teachings of the present invention, that placement markers may be embodied in many forms and may be dynamic in respect to each final application.

In an exemplary embodiment, the system and method disclosed herein may be used to provide a show quality, multi-color, multi-coat, fully-custom, powder-coat and sublimation painting process for irregular, elliptical, or complex metal, composite materials, stone, glass, wood, and plastic objects, for example, motorcycle parts, utilizing the 3D scan technology to accurately design and showcase a model for the customer of the finished work.

Figure 5:
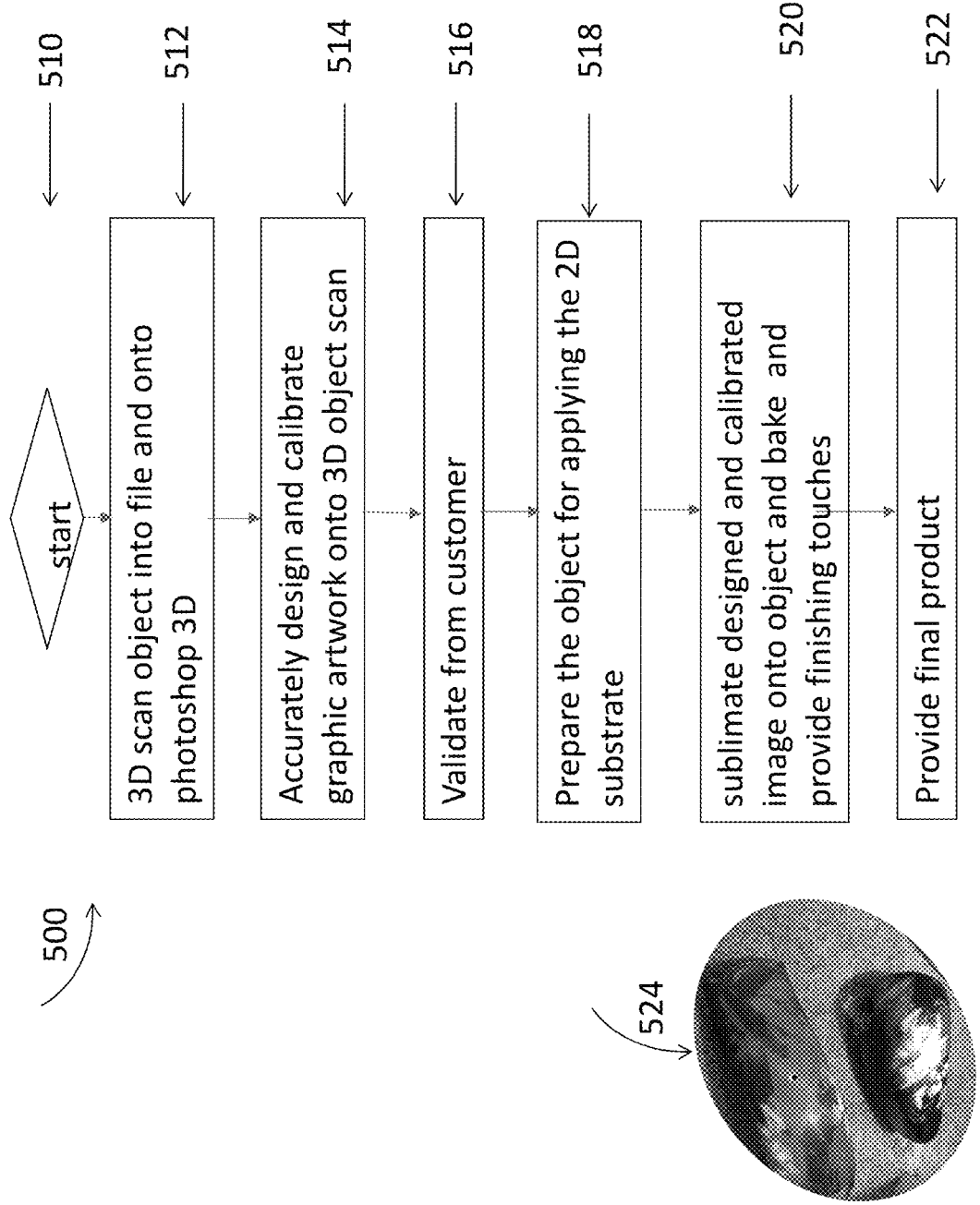
FIG. 5 illustrates an exemplary application that employs the system and method for applying a 2D substrate onto an object, in accordance with an embodiment of the present invention.

Referring to FIG. 5, is illustrated an exemplary application that employs the method 500 for applying a 2D substrate onto an object, in accordance with an embodiment of the present invention. The method 500 starts with a step 510. In a first step 512, a 3D scanner may be used to scan the actual parts of a motorcycle, for example, gas tanks, fenders, oil tanks rocker covers side covers etc. . . . In a step 514, a graphic art may be accurately designed and calibrated onto the scanned image of the 3D object. In one embodiment, this may be achieved by uploading the 3D scan from step 512 to a computing system having a designated software program, for example, Photoshop, and the designed artwork may be applied to the 3D scanned image for calibration, scaling, and image application using a form fitting, usually polyester, fabric to sublimate dyes from the fabric into an object or into the paint of an object. In a step 516, the result of step 514 may be validated by sharing with a customer. The customer may be enabled to view the result on a computing system where the calibration was done, or the result of step 514 may be communicated to the customer and the customer may be enabled to download the result of step 514 on a personal device and view the same. The customer may be enabled to make edits or may suggest the required edits and give approval for the result of step 514, i.e., the graphic calibrated on the scan of a 3D object. In a step 518, the base object, for example, a fuel tank of a motor cycle, may be prepared for applying the 2D substrate or applicant. In one embodiment, the base object may be prepared by chemical stripping and sand blasting the object to prepare for a base coat. The base coat may include applying a powder coat on the object with an option of a relatively light-colored base coat such as white, metallic white, silver, clear coats and metallic clear coats and then the object is baked or otherwise cured. In step 520, imaging process may be employed to sublimate the designed and calibrated image onto the object. It may be appreciated by a person with ordinary skill in the art, in light of and in accordance with the teachings of the present invention, that the powder coatings may require several coats of paint using the standard application of a powder coating system, for example, a Gema application gun and controller. The first coats may be any light color and an optional clear base, then the imaging process that may include a form of sublimation, then a low temperature color powder coat or if the surface is prepped correctly a regular spray adhesive paint to hide imperfection, then another color coat if desired, then a final UV protectant clear as a finish coat, then a sand, buff, and polish to a show finish. A coating of water and dust resistant spray may also be applied. The method ends with step 522 where the final product, for example, gas tank of a motorcycle 522, is provided. In various embodiments, the painting process may include but may not be limited to infusion painting, sublimation painting, sublimation powder coating, TNT Custom™ painting, and custom infusion or custom infusion painting.

The method described in FIG. 5 and hereinabove may be advantageous in that, it may assist to minimize or eliminate the use of air brush graphics. (most air brush artist will not try to apply an air brushed graphic to powder coat paint because it is to difficult to prep the paint surface.) The method may also provide the ability to use all the high technology graphic imaging available in industry to create a superior custom powder coat application to a motorcycle and other irregular, elliptical, or complex objects metal, fiberglass, wood, composite, stone, glass, or plastic items with complete accuracy as well as much sharper and clearer images up to 800 DPI resolution or to the ability of the respective printer on a full powder coat paint process utilizing Kolorfusion International Inc.'s™ sublimation process utilizing their transfer material Kolortex™, and the like.

Accordingly, in various embodiments the system and method disclose herein is used for printing a graphic in 2D to be wrapped and either sublimated, adhered, imprinted, or displayed onto the object or entity. The use of scanning in an object into a 3D model file or designing the respective object in a 3D CAD program may be employed only to apply a 2D substrate and not for reconstruction of the object. The method may utilize either a pre-existing object that is scanned into a 3D model on the computing system or an exact or scaled 3D file created of the object or entity only to display artwork on the object or entity digitally to the customer for approval of the graphically designed object or entity, for the applicator to use as reference, and generally for the final application and end result to be representative of the 3D model's designs, fitment, and correlative physics. The artwork may be printed out or embroidered onto a 2D display format on a cloth, film, fabric, paper, or other 2D substrate relative application material to be wrapped and either sublimated, adhered, imprinted, embroidered, or displayed onto the object after obtaining customer or user approval. The result of the system and method disclosed herein includes a painted and sublimated object that was supplied by a customer or user or provided to a customer from the user or a $3^{rd}$ party organization. The online file of a 3D model is used only to display artwork or 2D substrate designs that is created for the customer and that which is finally wrapped to the object or entity respective to the final application.

In one exemplary embodiment, as described with reference to FIG. 5, the system and method disclosed herein may be employed to perfect and use Kolorfusion International Inc.'s™ fabric sublimation process to create custom designed powder coat paint jobs for motorcycles and other applicable objects and materials included in Kolorfusion International Inc.'s™ sublimation process. The system and method disclosed herein may assist in minimizing or abolishing the need for complex manual surface area mapping in order to calibrate the size, scope, and positioning of graphics or 2D substrates to various surfaces. Further, the system and method disclosed herein may enable not only the user to be able to accurately design and calibrate graphics to surfaces but also enable the customer to see and approve the design and calibration before final application on a variety of applications. Further, the system and method disclosed herein may enable not only the user to be able to accurately design and calibrate customized digital UV overlay 2D substrate representations with or without texture added to the various surfaces but also enable the customer to see and approve the design and/or calibration before final application on a variety of applications that would be represented by the dimensionally exact represented 3D model of the real-life object or entity of what it would look like customized or fitted after final application.

Further, the system and method disclosed herein are advantageous in (i) Improving upon traditional final application methods for applications described herein, i.e., increasing accuracy by 2D substrate size calibration, increasing consistency by lessening human error potential, increasing creative artistic design applications that have never been used before in their final applications by using wide variety of graphic design functions of software programs like Photoshop, increasing quality of final product of applicable application by enhancing the design using software programs like Photoshop, designing properly to calibrated 2D substrate digital representation, and applying calibrated piece of final transfer fabric that has been designed and calibrated to fit and form to the applicable object or entity accurately; (2) lowering labor costs by reducing hours spent on hand methods of painting or decorating an object or entity when now it would be possible for a graphic designer to do it quicker, less expensive, and with higher graphic definition to transfer or correlate directly to the final application; (3) designing and calibrating graphics, patterns, images, pictures, or otherwise around complex, irregular, flexible, or any potential surfaces on a digital 3D model before actually printing a 2D proportional and calibrated unwrapped cloth, vinyl, paper, film, or other 2D applicant material in order to overcome or minimize the imperfect ability of a human being to design, scale, and calibrate graphics to such potential final applicable objects or entities; (4) creating the marketable ability to scan in or dimensionally, proportionally recreate an entity or object, submit that scanned in or recreated 3D object or entity into a graphic design program after it is retopologized or may have the proper properties to be designed on and unwrapped in the design program such as being a low polygonal model/mesh, design tattoos or clothes or other graphics to perfectly fit from the perfect measurements made by 3D scanning or pre-manufacturing specifications and from those designs able to directly plug into another program that may custom print out, for example, tailor made clothes to be stitched together or print out tattoos whether it's for a stencil for a permanent or henna tattoo or a print for a temporary tattoo to perfectly fit the object or entity. The system and method may also include any other need for a perfect scaled and calibrated piece of graphics or cloth or vinyl similar substrate to be fitted to an object or entity whether for adhesive display, sublimation, imprinting, or any other sort of display of a 2D substrate to fit properly to the individual object or entity; and (5) giving the user or customer further reaching design, fitment, and quality capabilities on objects and entities when it comes to the field of art and design as a whole as there are so many 2D substrate final application methods available that may have the ability for this method to be directly "plugged in" to the respective 2D substrate printer. In one embodiment, the unwrapping may be carried using software for UV mapping and unwrapping.

Accordingly, in various embodiments, the system and method disclosed herein may provide solutions to various problems including but not limited to: (i) limited human ability to accurately and consistently design, scale, and calibrate graphics or any 2D substrate onto a 3D object or entity, (ii) limited ability in each final application process when it comes to knowing ahead of time before experimentation what size and to what proportion to print out, cut out, plot, embroider, or design to the final 2D substrate applicant to fit onto or form around the 3D object or entity of the respective final application, (iii) limited human artistic definition and application quality of final applicated graphics/fitting results to object or entity through a variety of applications by being able to design in a graphics program that enables high quality graphics that are accurately calibrated to the size and surface area of the object or entity by means of an exact 3D digital replica of the object or entity to design and calibrate a surface map of the object or 3D mesh overlays for garment representation before printing a real 2D UV or UVW map in exact proportional dimensions to fit or form to the final 3D object or entity partially or entirely, (iv) limited human ability to accurately design around or on top of graphics on a 2D substrate to properly cover up or add onto existing graphics on a 3D entity or object, (v) limited human ability to sketch stencils for final tattoos or graphics on any 3D entity or object unlimiting to the graphical definition of the respective 2D substrate printer to be 2D scanned into a tattoo stencil or temporary tattoo printer or directly connected to the printer making the final tattoo stencil, temporary tattoo, or any 2D substrate stencil available, and (vi) limited human ability to design and calibrate stencils by hand for any stencil necessary activity like spray painting or airbrushing for example on any 3D entity or object unlimiting to the graphical definition of the respective 2D substrate printer and the ability of the user to design the stencil for the 3D object or entity on the respective potential software program such as Photoshop.

Additional advantages of the system and method disclosed herein, may include but are not limited to: (i) quick design turn-around time since graphic design may be applied to arts that previously graphic designers couldn't be involved in; (ii) high definition output since the 2D substrates are obtained from a very precise printer and not a human hand or a human controlled device; (iii) quick and accurate calibration, design, and final product output in comparison to traditional done-by-hand measurement and production methods of 2D applicant to 3D object or entity application methods; (iv) gives user or customer the opportunity to view the final application output before final application is applied thus providing more quality control and customer service in comparison to current traditional methods; (v) eliminates or minimizes potential for human error than traditional methods to come up with a similar desired result of the disclosed system and method; (vi) fool proof ability to design around or on top of existing graphics; (vii) unlimit many capabilities of artists and designers in many industries, (viii) further art and design to an ever more expansive range of possibilities when referring to applications and problems solved, and the like.

The system and method included herein may provide applications for individuals or organizations creating, designing, or printing on substrates for sublimation processes, individuals or organizations creating, designing, or printing on vinyl or other adhesive wraps, individuals or organizations tailor making and/or custom designing graphics printed onto or embroidered clothing or fabrics for any entity or object, individuals or organizations custom making permanent or temporary tattoos utilizing tattoo stencils for any entity, individuals or organizations custom designing onto and/or calibrating any 2D substrate to any respective final application applicable 3D object or entity, and the like.

In various embodiments, the system and method enclosed herein may have a variety of applications that may include but are not limited to:

(1) Custom creating, designing, printing, or plotting on various substrates for custom design and fitment for sublimation processes. When using sublimation processes there may arise a problem of wrapping the respective 2D substrate to the respective 3D object or entity to where there is no absolute predictability in the final graphics location from the transfer substrate to the final applied substrate in regard to the size of the 2D substrate printed and the positioning of the graphics on the respective 2D substrate. The method disclosed herein may fix both those problems as there may be an exact representation of the 3D final application result and the final 2D applicant on a displayable digital medium to be able to design, calibrate, and refer to for placement to a high degree of accuracy and consistency. Thus, in the final application the 2D substrate may be calibrated to fit to the object or entity accurately according to the customer or user's specifications approved upon the 3D model and the design is applied on the 2D substrate via printing, plotting, or embroidering for relativity from the 3D model to the 3D object or entity accurately.

(2) Custom creating, designing, printing, or plotting on various adhesive wraps for a custom design and fitment. When using adhesive wraps there may arise a problem of wrapping the respective adhesive 2D substrate to the respective 3D object or entity to where there is no absolute predictability in the final graphics location in regard to the size of the adhesive 2D substrate printed and the positioning of the graphics on the respective 2D substrate. The method disclosed herein may fix both of those problems as there is an exact representation of the 3D final application result and the final 2D substrate applicant on a displayable digital medium to be able to design, calibrate, and refer to for placement to a high degree of accuracy and consistency especially in comparison to traditional techniques. Thus, in the final application the 2D substrate may be calibrated to fit the object or entity accurately and the design is applied on the 2D substrate to the 3D entity or object accurately. This process would entirely fix the problem vinyl wrapping companies have when encountering curved surfaces such as fenders or step-side pickups which they have to resize and print the vinyl wrap multiple times until they get the right size printed adhesive and respective graphic to which it will fit accurately to specifications.

(3) Tailor making, designing, and fitting clothing to be printed, embroidered designs upon, and sewed together to perfectly fit any entity relative to how the clothing fit onto the 3D model of the entity. When tailors measure an entity or object for custom tailoring clothes it may be time consuming and not consistently accurate due to a simple measuring tape and human error regardless of experience or skill. Not only that but if the clothes being tailored have graphics or will have graphics on them it is especially difficult to know where to print the graphics on the individual pieces of cloth to be later sewed together. The method disclosed herein uses UV mapping an exact 3D representation of the entity or object with or without the custom tailored clothing designed onto the 3D model to be able to predictably design and calibrate the end 2D unwrapped graphic or embroidery file with underlying UV map structural specifications of respective polygon count, shape, proportion, alignment, mesh tension relieving techniques, and overall mesh and seam line structure to accurate proportions and dimensions of the entity or object including placement of graphics on the final printed, plotted, or embroidered 2D applicant or 2D substrate. Thus, in the final application the 2D substrate may be calibrated to fit the relative object or entity accurately and the graphic and structural design is applied on the 2D substrate to the 3D entity or object accurately. This same process may be used to make covers for various objects such as vehicles and seat covers as well as individual pieces printed or plotted out then later sewn together. The sewing is utilized through an embroidery module and this module may sew designs onto the fabric or sew the fabric to another designed and calibrated fabric utilizing the same process to designate where to sew using embroidery files or converted graphic files.

(4) Custom making permanent tattoo stencils or temporary tattoos for any possible entity or object application. When using tattoo stencils or temporary tattoos there arises a problem of wrapping the stencil or temporary tattoo transfer substrate to the respective 3D object or entity to where there is no absolute predictability in the final graphics location in regard to the size of the 2D substrate printed and the positioning of the graphics on the respective 2D substrate. Not only that but if the entity has a tattoo in need of covering up or designing around when the entity is scanned in that includes the existing tattoo so in the Photoshop functioning software program there arises an opportunity to accurately and consistently design around or on top of the current tattoo to perfection and the user or customer now has the chance to see that directly on their 3D represented body before final application. Finally, the stencils used currently in tattooing an individual are sketched by an artist with design and scaling skills by hand that are limited, this method gives the opportunity to not only accurately be able to design and calibrate the graphics/tattoos onto the entity or object accurately but be able to print the graphics designed in a much higher definition than most artists can sketch. To add clarity to this application the end result from the method disclosed herein would be printed out on a normal paper printer, then simply 2D scanned into a stencil or temporary tattoo making printer unless the computer is able to directly connect and print to a stencil or temporary tattoo making printer. Thus, the method disclosed herein may fix all four of those problems as there is an exact representation of the 3D final application result and the final 2D substrate applicant on a displayable digital medium to be able to design, calibrate, and refer to for placement to a high degree of accuracy and consistency. Thus, in the final application 2D substrate may be calibrated to fit object or entity accurately and the design is applied on 2D substrate to 3D entity or object accurately and perfect relation and representation of the 3D model approved by the customer or user respective to final application.

In various embodiments, the system and method disclosed herein may also find applications in accurately designing around or on top of existing graphics to properly cover up, change, or add to existing graphics on a 3D entity or object, increasing the graphical definition of the respective 2D substrate printed or used in the making of the final tattoo stencil or temporary tattoo stencil, custom designing onto and/or calibrating any 2D substrate to any final applicable 3D object or entity for any reason that the final 2D substrate application enables, for example, stencil making, sticker creation, design, and placement, custom designed and fitted signs, ornamental object paper wrapping or folding, ornamental precision bed making, precision fabric cover making, anything wrapped to precision including or not including graphic design on the 2D substrate, and the like.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 6:
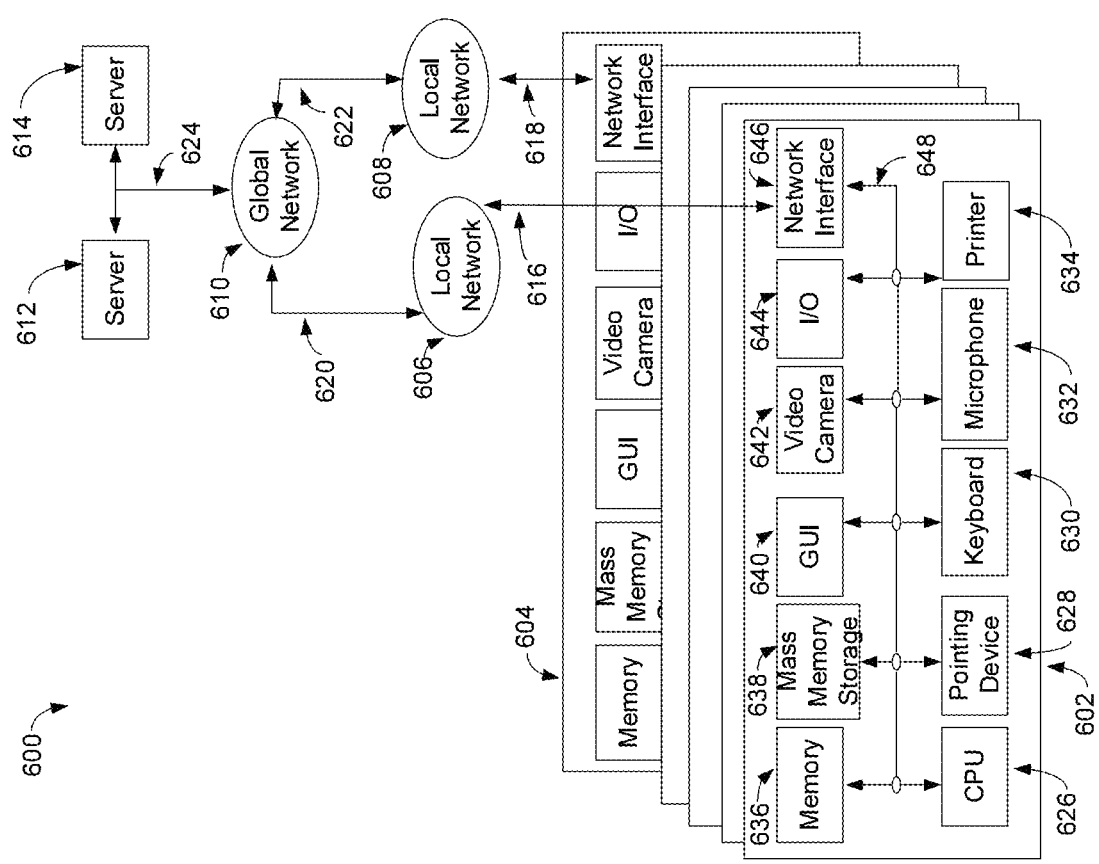
FIG. 6 is a block diagram depicting an exemplary client/server system which may be used by an exemplary web-enabled/networked embodiment of the present invention.

FIG. 6 is a block diagram depicting an exemplary client/server system which may be used by an exemplary web-enabled/networked embodiment of the present invention. FIG. 6 is a block diagram depicting an exemplary client/server system which may be used by an exemplary web-enabled/networked embodiment of the present invention.

A communication system 600 includes a multiplicity of clients with a sampling of clients denoted as a client 602 and a client 604, a multiplicity of local networks with a sampling of networks denoted as a local network 606 and a local network 608, a global network 610 and a multiplicity of servers with a sampling of servers denoted as a server 612 and a server 614.

Client 602 may communicate bi-directionally with local network 606 via a communication channel 616. Client 604 may communicate bi-directionally with local network 608 via a communication channel 618. Local network 606 may communicate bi-directionally with global network 610 via a communication channel 620. Local network 608 may communicate bi-directionally with global network 610 via a communication channel 622. Global network 610 may communicate bi-directionally with server 612 and server 614 via a communication channel 624. Server 612 and server 614 may communicate bi-directionally with each other via communication channel 624. Furthermore, clients 602, 604, local networks 606, 608, global network 610 and servers 612, 614 may each communicate bi-directionally with each other.

In one embodiment, global network 610 may operate as the Internet. It will be understood by those skilled in the art that communication system 600 may take many different forms. Non-limiting examples of forms for communication system 600 include local area networks (LANs), wide area networks (WANs), wired telephone networks, wireless networks, or any other network supporting data communication between respective entities.

Clients 602 and 604 may take many different forms. Non-limiting examples of clients 602 and 604 include personal computers, personal digital assistants (PDAs), cellular phones and smartphones.

Client 602 includes a CPU 626, a pointing device 628, a keyboard 630, a microphone 632, a printer 634, a memory 636, a mass memory storage 638, a GUI 640, a video camera 642, an input/output interface 644 and a network interface 646.

CPU 626, pointing device 628, keyboard 630, microphone 632, printer 634, memory 636, mass memory storage 638, GUI 640, video camera 642, input/output interface 644 and network interface 646 may communicate in a unidirectional manner or a bi-directional manner with each other via a communication channel 648. Communication channel 648 may be configured as a single communication channel or a multiplicity of communication channels.

CPU 626 may be comprised of a single processor or multiple processors. CPU 626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 636 is used typically to transfer data and instructions to CPU 626 in a bi-directional manner. Memory 636, as discussed previously, may include any suitable computer-readable media, intended for data storage, such as those described above excluding any wired or wireless transmissions unless specifically noted. Mass memory storage 638 may also be coupled bi-directionally to CPU 626 and provides additional data storage capacity and may include any of the computer-readable media described above. Mass memory storage 638 may be used to store programs, data and the like and is typically a secondary storage medium such as a hard disk. It will be appreciated that the information retained within mass memory storage 638, may, in appropriate cases, be incorporated in standard fashion as part of memory 636 as virtual memory.

CPU 626 may be coupled to GUI 640. GUI 640 enables a user to view the operation of computer operating system and software. CPU 626 may be coupled to pointing device 628. Non-limiting examples of pointing device 628 include computer mouse, trackball and touchpad. Pointing device 628 enables a user with the capability to maneuver a computer cursor about the viewing area of GUI 640 and select areas or features in the viewing area of GUI 640. CPU 626 may be coupled to keyboard 630. Keyboard 630 enables a user with the capability to input alphanumeric textual information to CPU 626. CPU 626 may be coupled to microphone 632. Microphone 632 enables audio produced by a user to be recorded, processed and communicated by CPU 626. CPU 626 may be connected to printer 634. Printer 634 enables a user with the capability to print information to a sheet of paper. CPU 626 may be connected to video camera 642. Video camera 642 enables video produced or captured by user to be recorded, processed and communicated by CPU 626.

CPU 626 may also be coupled to input/output interface 644 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 626 optionally may be coupled to network interface 646 which enables communication with an external device such as a database or a computer or telecommunications or internet network using an external connection shown generally as communication channel 616, which may be implemented as a hardwired or wireless communications link using suitable conventional technologies. With such a connection, CPU 626 might receive information from the network, or might output information to a network in the course of performing the method steps described in the teachings of the present invention.

Figure 7:
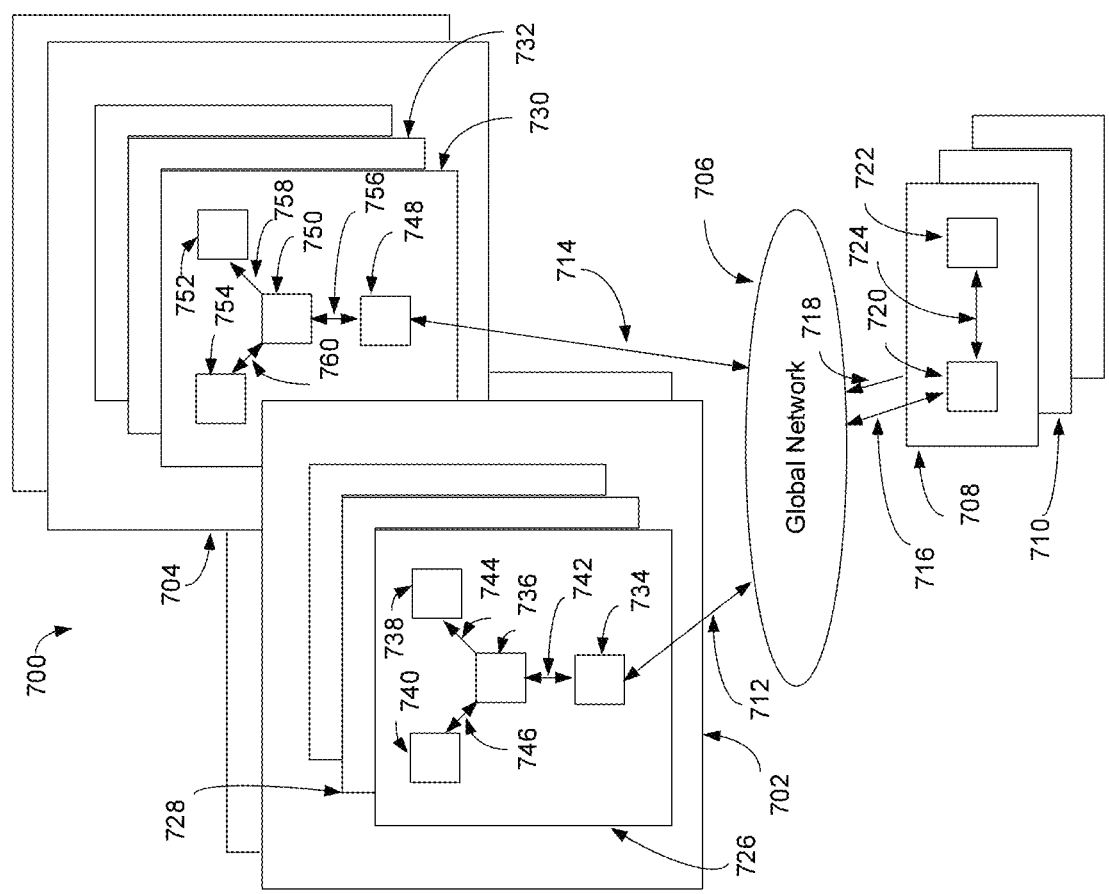
FIG. 7 illustrates a block diagram depicting a conventional client/server communication system.

FIG. 7 illustrates a block diagram depicting a conventional client/server communication system. FIG. 7 illustrates a block diagram depicting a conventional client/server communication system, which may be used by an exemplary web-enabled/networked embodiment of the present invention.

A communication system 700 includes a multiplicity of networked regions with a sampling of regions denoted as a network region 702 and a network region 704, a global network 706 and a multiplicity of servers with a sampling of servers denoted as a server device 708 and a server device 710.

Network region 702 and network region 704 may operate to represent a network contained within a geographical area or region. Non-limiting examples of representations for the geographical areas for the networked regions may include postal zip codes, telephone area codes, states, counties, cities and countries. Elements within network region 702 and 704 may operate to communicate with external elements within other networked regions or within elements contained within the same network region.

In some implementations, global network 706 may operate as the Internet. It will be understood by those skilled in the art that communication system 700 may take many different forms. Non-limiting examples of forms for communication system 700 include local area networks (LANs), wide area networks (WANs), wired telephone networks, cellular telephone networks or any other network supporting data communication between respective entities via hardwired or wireless communication networks. Global network 706 may operate to transfer information between the various networked elements.

Server device 708 and server device 710 may operate to execute software instructions, store information, support database operations and communicate with other networked elements. Non-limiting examples of software and scripting languages which may be executed on server device 708 and server device 710 include C, C++, C# and Java.

Network region 702 may operate to communicate bi-directionally with global network 706 via a communication channel 712. Network region 704 may operate to communicate bi-directionally with global network 706 via a communication channel 714. Server device 708 may operate to communicate bi-directionally with global network 706 via a communication channel 716. Server device 710 may operate to communicate bi-directionally with global network 706 via a communication channel 718. Network region 702 and 704, global network 706 and server devices 708 and 710 may operate to communicate with each other and with every other networked device located within communication system 700.

Server device 708 includes a networking device 720 and a server 722. Networking device 720 may operate to communicate bi-directionally with global network 706 via communication channel 716 and with server 722 via a communication channel 724. Server 722 may operate to execute software instructions and store information.

Network region 702 includes a multiplicity of clients with a sampling denoted as a client 726 and a client 728. Client 726 includes a networking device 734, a processor 736, a GUI 738 and an interface device 740. Non-limiting examples of devices for GUI 738 include monitors, televisions, cellular telephones, smartphones and PDAs (Personal Digital Assistants). Non-limiting examples of interface device 740 include pointing device, mouse, trackball, scanner and printer. Networking device 734 may communicate bi-directionally with global network 706 via communication channel 712 and with processor 736 via a communication channel 742. GUI 738 may receive information from processor 736 via a communication channel 744 for presentation to a user for viewing. Interface device 740 may operate to send control information to processor 736 and to receive information from processor 736 via a communication channel 746. Network region 704 includes a multiplicity of clients with a sampling denoted as a client 730 and a client 732. Client 730 includes a networking device 748, a processor 750, a GUI 752 and an interface device 754. Non-limiting examples of devices for GUI 738 include monitors, televisions, cellular telephones, smartphones and PDAs (Personal Digital Assistants). Non-limiting examples of interface device 740 include pointing devices, mousse, trackballs, scanners and printers. Networking device 748 may communicate bi-directionally with global network 706 via communication channel 714 and with processor 750 via a communication channel 756. GUI 752 may receive information from processor 750 via a communication channel 758 for presentation to a user for viewing. Interface device 754 may operate to send control information to processor 750 and to receive information from processor 750 via a communication channel 760.

For example, consider the case where a user interfacing with client 726 may want to execute a networked application. A user may enter the IP (Internet Protocol) address for the networked application using interface device 740. The IP address information may be communicated to processor 736 via communication channel 746. Processor 736 may then communicate the IP address information to networking device 734 via communication channel 742. Networking device 734 may then communicate the IP address information to global network 706 via communication channel 712. Global network 706 may then communicate the IP address information to networking device 720 of server device 708 via communication channel 716. Networking device 720 may then communicate the IP address information to server 722 via communication channel 724. Server 722 may receive the IP address information and after processing the IP address information may communicate return information to networking device 720 via communication channel 724. Networking device 720 may communicate the return information to global network 706 via communication channel 716. Global network 706 may communicate the return information to networking device 734 via communication channel 712. Networking device 734 may communicate the return information to processor 736 via communication channel 742. Processor 736 may communicate the return information to GUI 738 via communication channel 744. User may then view the return information on GUI 738.

Figure 8A:
FIGS. 8A to 8H illustrate and exemplary process for designing, calibrating, and applying a two-dimensional (2D) substrate onto a three-dimensional (3D) object, where 8A illustrates a 'before' picture, 8B illustrates a part being scanned, 8C illustrates a raw 3D model, 8D illustrates model refining, 8E illustrates a model converted from a triangular high polygon count mesh to a low polygon count rectangular mesh, 8F illustrates 3D models used for designing/calibrating, 8G illustrates a 3D model with designs on the left and a real-life object after application on the right, 8H illustrates a real-life object after application, in accordance with an embodiment of the present invention.
Figure 8B:
Figure 8C:
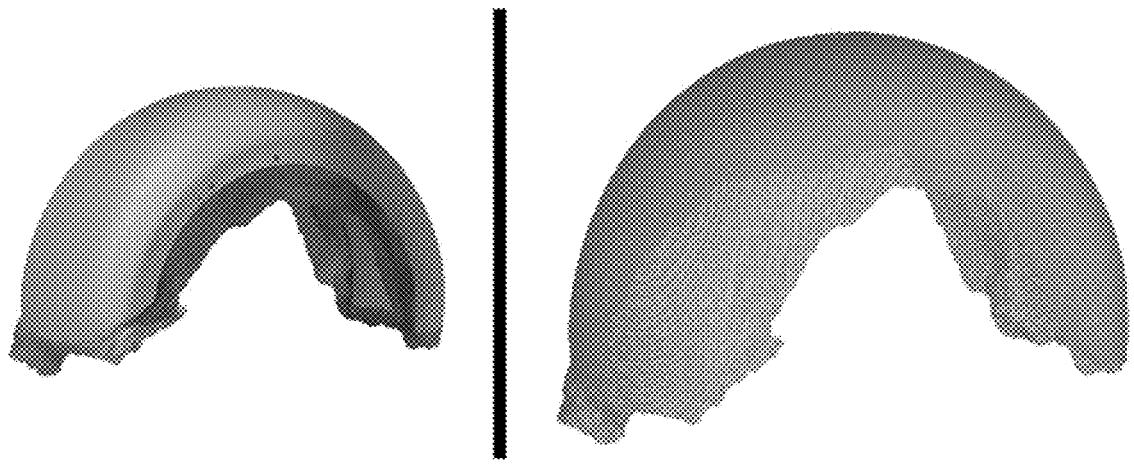
Figure 8D:
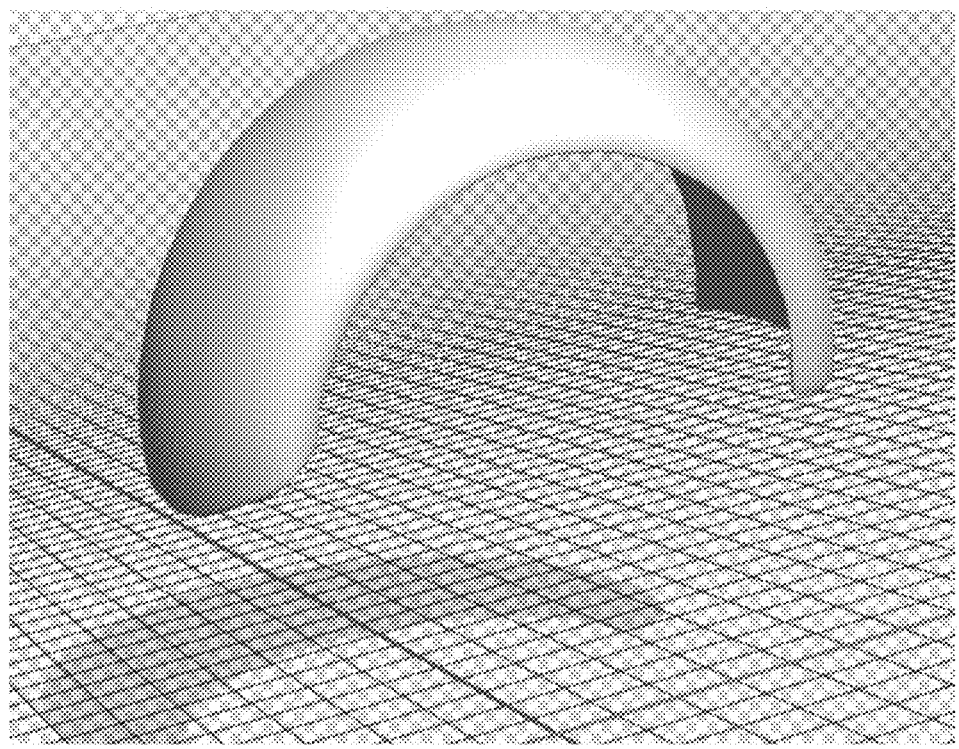
Figure 8E:
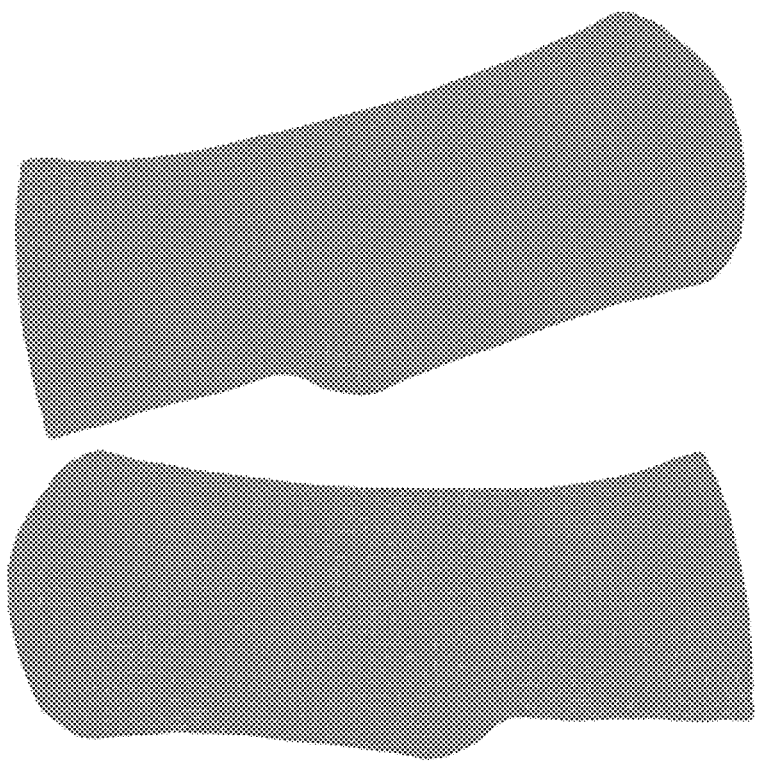
Figure 8F:
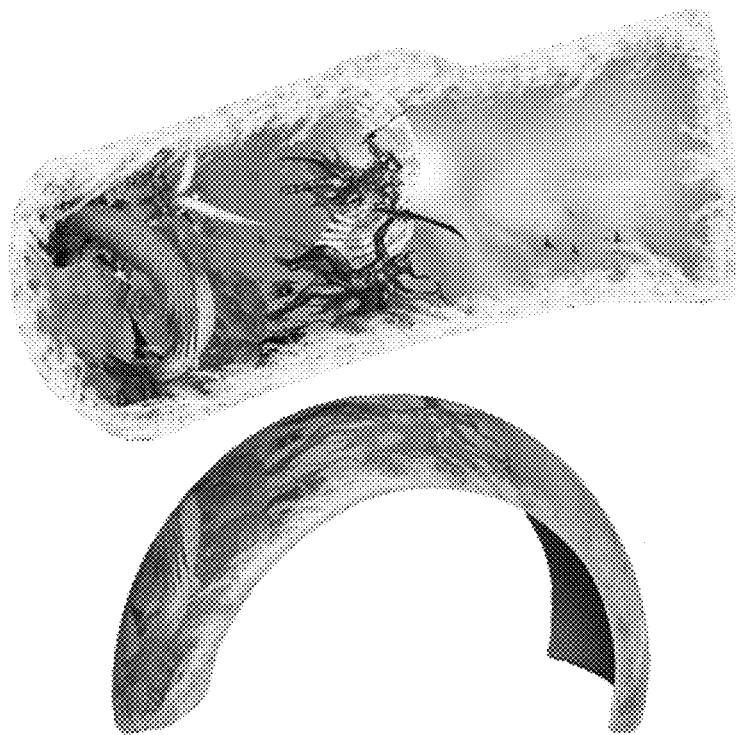
Figure 8G:
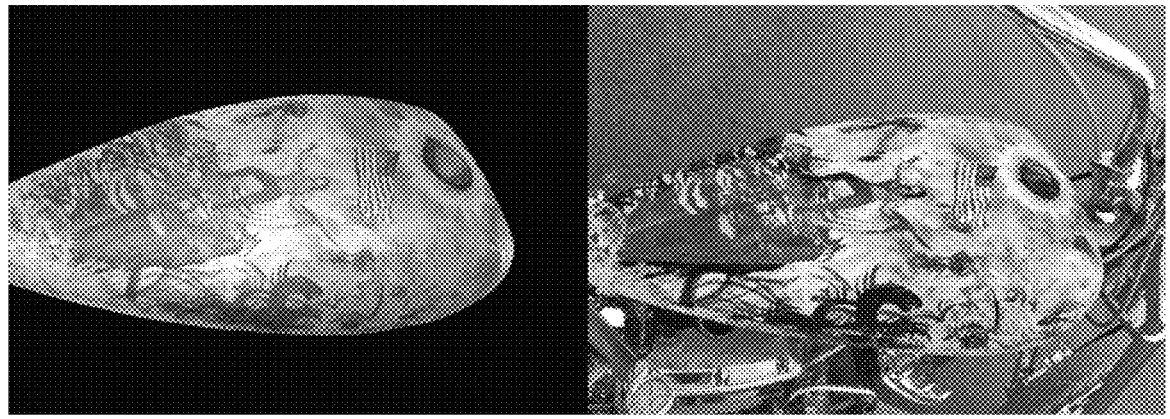
Figure 8H:
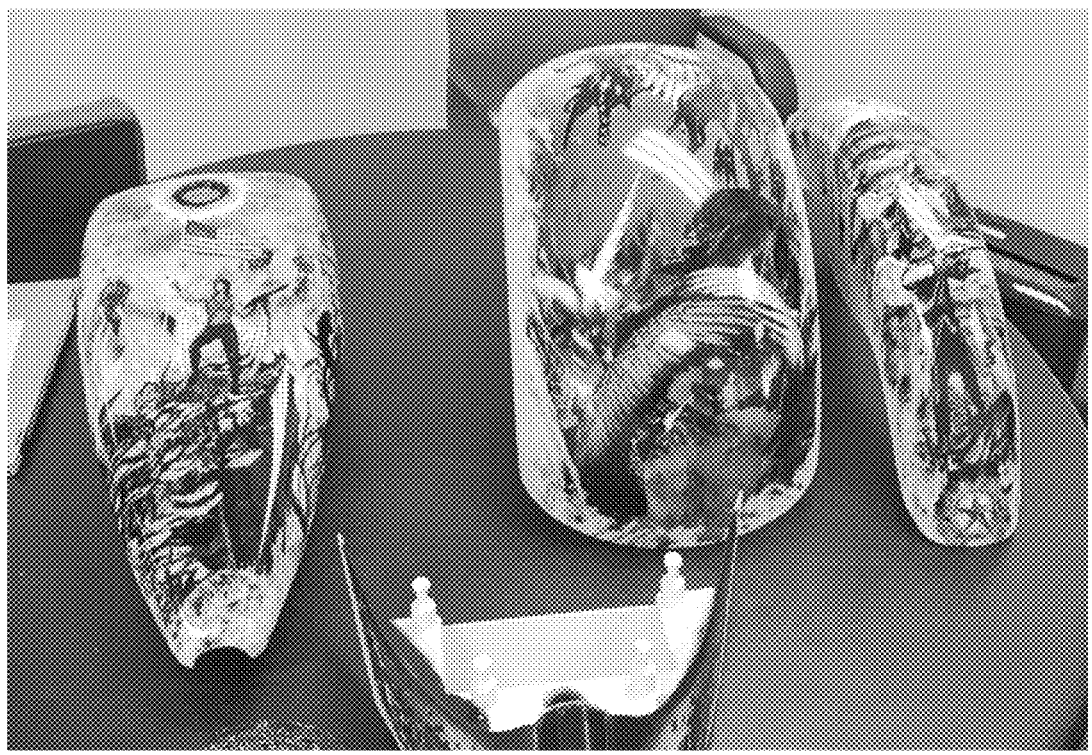

FIGS. 8A to 8H illustrate and exemplary process for designing, calibrating, and applying a two-dimensional (2D) substrate onto a three-dimensional (3D) object, where 8A illustrates a 'before' picture, 8B illustrates a part being scanned, 8C illustrates a raw 3D model, 8D illustrates model refining, 8E illustrates a model converted from a triangular mesh to a rectangular mesh, 8F illustrates 3D models used for designing/calibrating, 8G illustrates a 3D model with designs on the left and a real-life object after application on the right, 8H illustrates a real-life object after application, in accordance with an embodiment of the present invention. FIG. 8 illustrates a 3D dye sublimation on a complex object using a 2D substrate transfer material "Kolortex" © which may be highly formable used for a proof of concept motorcycle paint job. FIG. 8A illustrates a motorcycle before any of the process has started. FIG. 8B illustrates a torn down part which may be scanned, where a part may be painted white with a blue material placed under it which may improve reflectivity and edge processing if a 3D scanner may be lower quality. FIG. 8C illustrates a raw 3D model of each object after a part may be scanned. FIG. 8D illustrates a CAD program for manipulating and refining a model which may smooth out any imperfections. FIG. 8E illustrates a top and bottom side having gone through a retopologization module for converting a triangle mesh into a rectangle mesh with a lower polygonal count. This may be followed by a 3D seaming along an edge which may help a 3D dye sublimation dye infusion process. FIG. 8F illustrates 3D models on Photoshop which may be used for designing and calibrating artwork, which may allow a user to see what a final product may look like. Once verified by a user it may be printed. This may allow a 3D model to have any texture wrapped around it similar to mapping from UVW to XYZ coordinates. Calibration may then be carried out after printing or after application. FIG. 8G illustrates a 3D model with designs on the left, and a real-life object after application on the right. FIG. 811 illustrates real-life parts after 3D dye sublimation application may be completed.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular final 2D substrate application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a system and method for applying 2D substrate onto an object according to the present invention will be apparent to those skilled in the art. Various aspects of the invention have been described above by way of illustration, and the specific embodiments disclosed are not intended to limit the invention to the particular forms disclosed. The particular implementation of the system and method for applying 2D substrate onto an object may vary depending upon the particular context or application. By way of example, and not limitation, the system and method for applying 2D substrate onto an object described in the foregoing were principally directed to applying graphics onto an object implementations; however, similar techniques may instead be applied to engineering, graphical design, and all the different final 2D substrate application method printers, plotters, as well as embroidery machines and all of those different respective industries, a user wanting to use this process in production or manufacturing of products that require custom powder coat painted products at a show quality finish with custom graphics, and any user wanting to use this process to custom powder coat paint a metal, wood, stone, glass, composite materials, or plastic objects with a show quality finish with custom graphics or colors, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising the steps of:
    scanning an object with a three-dimensional (3D) scanning module of a computing system with a processing unit that is configured to execute a scanning computer code stored in a non-transitory computer readable medium;
    providing at least one of a first three-dimensional (3D) image model and a first 3D mesh model from said scanned object, where at least one of said first three-dimensional (3D) image model and 3D mesh model is characterized with an XYZ coordinate plane;
    retopologizing at least one of said first three-dimensional (3D) image model and 3D mesh model with a calibration module;
    wherein said retopologizing comprises re-building at least one of said first three-dimensional (3D) image model and 3D mesh model characterized with an XYZ coordinate plane to a second 3D mesh model characterized with a UVW coordinate plane having significantly the same volume and shape but with a different mesh layout;
    wherein said retopologizing further comprises reducing a polygon count of at least one of said first three-dimensional (3D) image model and 3D mesh model;
    applying a UV mapping process to said second 3D mesh model, where said "U" and "V" of said UV are a two-dimensional axes of said UVW coordinate plane;
    said UV mapping process comprises extracting at least one of, a UV map and 2D image from said UVW coordinate plane;
    said UV mapping process further comprises projecting or wrapping said 2D image to at least one of said first three-dimensional (3D) image model and 3D mesh model;
    calibrating with a calibration module of said computing system, said three-dimensional (3D) image model;
    unwrapping said three-dimensional (3D) image model with a 3D to 2D translation module;
    converting, with said 3D to 2D translation module, said unwrapped three-dimensional (3D) image model into a two-dimensional (2D) graphic or embroidery file format.

2. The method in claim 1, further comprising the steps of printing, plotting, or embroidering said two-dimensional (2D) graphic or embroidery file format with a printing, plotting, or embroidering module.

3. The method in claim 2, in which said printing, plotting, or embroidery step provides a printed, plotted, or embroidered 2D graphic or templated substrate.

4. The method in claim 3, further comprising the steps of storing said two-dimensional (2D) graphic or embroidery file in a database of said computing system.

5. The method in claim 4, further comprising the steps of displaying said three-dimensional (3D) image model alongside said two-dimensional (2D) graphic or embroidery file format with a display module.

6. The method in claim 5, further comprising, with a communication module, the steps of receiving and sending communication between the modules of said computing system.

7. The method in claim 6, further comprising the steps of receiving sensor information from sensors in said three-dimensional (3D) scanning module.

8. The method in claim 7, further comprising the steps of interfacing said sensor module, said communication module, said 3D to 2D module, and said database module with an interface module, wherein said interface module is configured to assist said computing system in performing said scanning, 3D CAD, retopologizing, 3D mesh and UV unwrap structural design, unwrapping, calibration, graphic design, and converting steps.

9. The method in claim 1, in which said unwrapping step further comprise the steps of unwrapping the three-dimensional (3D) image model to said two-dimensional (2D) graphic or embroidery file format.

10. The method in claim 9, in which said three-dimensional (3D) digital file created with a 3D CAD software program.

11. The method in claim 10, in which said three-dimensional digital file is opened with a graphical software program.

12. The method in claim 3, further comprising the steps of imprinting, sublimating, applying, embroidering for design or fitment, or adhering said 2D graphic substrate onto said object or entity.

13. The method in claim 3, further comprising the steps of scanning said object with at least one of, a short range, a laser triangulation, a structured light, a sound or sonar wave based, a laser based, or any 3D scanner type optimal for the relative final application based on specifications of the final application.

14. The method in claim 1, further comprising the steps of:
choosing a first key polygon on said XYZ coordinate plane of said first three-dimensional (3D) image model and 3D mesh model; and
determining a dimension of said first key polygon, said dimension comprises at least one of, a length, a width, and a diagonal of said first key polygon.

15. The method in claim 14, in which said UV unwrapping further comprising the steps of unwrapping said first three-dimensional (3D) image model or 3D mesh model of said XYZ coordinate plane to said UVW coordinate plane.

16. The method in claim 15, further comprising the steps of:
choosing a second key polygon on said UVW coordinate plane of said retopologized or second three-dimensional (3D) image model and 3D mesh model; and
determining a dimension of said second key polygon, said dimension comprises at least one of, a length, a width, and a diagonal of said retopologized or second key polygon.

17. The method in claim 16, further comprising the steps of:
comparing said first key polygon with said second key polygon; and
converting said UV map into a printable, plottable, or embroider-able graphic or embroidery file for printing, plotting, or embroidering, if the determined dimension of said first key polygon substantially match the determined dimension of said second key polygon.

18. A system comprising:
means for scanning an object;
means for executing a scanning computer code stored in a non-transitory computer readable medium;
means for providing a first three-dimensional (3D) image model from said scanned object or from a user input;
means for resealing said first three-dimensional (3D) image model;
means for calibrating said first three-dimensional (3D) image model;
means for retopologizing said first three-dimensional (3D) image model;
said retopologizing means comprises rebuilding said first three-dimensional (3D) image model having the same volume and shape but with a different mesh layout and reduced polygon count;
means for extracting at least one of, a UV map and 2D image from said retopologized first three-dimensional (3D) image model;
means for wrapping said extracted UV map or 2D image to said first three-dimensional (3D) image model;
means for unwrapping said three-dimensional (3D) image model;
means for converting said unwrapped three-dimensional (3D) image model into a two-dimensional (2D) graphic or embroidery file format;
means for printing or embroidering said two-dimensional (2D) graphic or embroidery file format; and
means for providing a printed, plotted, or embroidered 2D graphic or templated substrate.

19. A system comprising:
a computing system with a processing unit that is configured to execute a computer code stored in a non-transitory computer readable medium;
a three-dimensional (3D) scanning module of said computing system that is configured to scan an object;
a 3D CAD module that is configured to provide a three-dimensional (3D) image model from said scanned object or from user input;
a rescaling module of said computing system that is configured to rescale said three-dimensional (3D) image model;
a calibration module of said computing system that is configured to retopologize said three-dimensional (3D) image model, wherein said retopologized three-dimensional (3D) image model comprises significantly the same volume and shape but with a different mesh layout and a reduced polygon count;
applying a UV mapping process to said retopologized three-dimensional (3D) image model, where said "U" and "V" of said UV are a two-dimensional (2D) axes of a UVW coordinate plane;
said UV mapping process comprises extracting at least one of, a UV map and 2D image from said retopologized three-dimensional (3D) image model in said UVW coordinate plane;
said UV mapping process further comprises projecting or wrapping said UV map or 2D image to said three-dimensional (3D) image model;
a 3D to 2D translation module that is configured to unwrap said three-dimensional (3D) image model and convert said unwrapped three-dimensional (3D) image model into a two-dimensional (2D) graphic or embroidery file format;

a printing, plotting, or embroidering module that is operable for printing, plotting, or embroidering said two-dimensional (2D) graphic or embroidery file format to produce a 2D graphic or templated substrate.

20. The system in claim 19, further comprising:
a database that is operable for storing said two-dimensional (2D) graphic or embroidery file;
a display module that is operable for displaying said three-dimensional (3D) image model alongside said two-dimensional (2D) graphic or embroidery file format for the relative final application; and
a communication module being operable for receiving and sending communication between the modules of said computing system.

* * * * *